US009136741B2

(12) United States Patent
Dharan

(10) Patent No.: US 9,136,741 B2
(45) Date of Patent: *Sep. 15, 2015

(54) METHOD FOR PRODUCING A KINETIC ENERGY STORAGE SYSTEM

(71) Applicant: QUANTUM ENERGY STORAGE CORPORATION, Poway, CA (US)

(72) Inventor: Cheruvari Karthik Hari Dharan, Berkeley, CA (US)

(73) Assignee: QUANTUM ENERGY STORAGE CORPORATION, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,749

(22) Filed: Jul. 2, 2014

(65) Prior Publication Data

US 2015/0008778 A1 Jan. 8, 2015

Related U.S. Application Data

(60) Provisional application No. 61/843,683, filed on Jul. 8, 2013.

(51) Int. Cl.
*H02K 7/09* (2006.01)
*H02K 7/02* (2006.01)
(Continued)

(52) U.S. Cl.
CPC ... *H02K 7/09* (2013.01); *B21J 1/06* (2013.01); *B21K 1/28* (2013.01); *B21K 1/32* (2013.01); *C21D 8/00* (2013.01); *C21D 9/00* (2013.01); *H02K 5/24* (2013.01); *H02K 7/003* (2013.01); *H02K 7/025* (2013.01); *H02K 7/08* (2013.01);
(Continued)

(58) Field of Classification Search
CPC ........................................................ H02K 7/09
USPC ............................................. 310/74, 90, 90.5
See application file for complete search history.

(56) References Cited

U.S. PATENT DOCUMENTS

| 2,380,770 A | 7/1945 | McFarland |
| 3,350,033 A | 10/1967 | Goldberg |

(Continued)

FOREIGN PATENT DOCUMENTS

| DE | 39 12 371 A1 | 10/1990 |
| JP | 56-020849 A | 2/1981 |

(Continued)

OTHER PUBLICATIONS

International Search Report and Written Opinion in International Application No. PCT/US2014/045275 mailed Jan. 9, 2015 (23 pages).

*Primary Examiner* — Dang Le
(74) *Attorney, Agent, or Firm* — Foley & Lardner LLP

(57) ABSTRACT

A flywheel energy storage system incorporates various embodiments in design and processing to achieve a very high ratio of energy stored per unit cost. The system uses a high-strength steel rotor rotating in a vacuum envelope. The rotor has a geometry that ensures high yield strength throughout its cross-section using various low-cost quenched and tempered alloy steels. Low-cost is also achieved by forging the rotor in a single piece with integral shafts. A high energy density is achieved with adequate safety margins through a pre-conditioning treatment. The bearing and suspension system utilizes an electromagnet that off-loads the rotor allowing for the use of low-cost, conventional rolling contact bearings over an operating lifetime of several years.

20 Claims, 24 Drawing Sheets

(51) Int. Cl.
   *B21J 1/06* (2006.01)
   *B21K 1/28* (2006.01)
   *C21D 8/00* (2006.01)
   *C21D 9/00* (2006.01)
   *H02K 15/02* (2006.01)
   *H02K 5/24* (2006.01)
   *H02K 7/00* (2006.01)
   *H02K 7/08* (2006.01)
   *H02K 11/00* (2006.01)
   *B21K 1/32* (2006.01)
   *H02K 16/00* (2006.01)

(52) U.S. Cl.
   CPC .......... *H02K 11/001* (2013.01); *H02K 11/0021* (2013.01); *H02K 15/02* (2013.01); *H02K 16/00* (2013.01); *Y10T 29/49012* (2015.01); *Y10T 74/2119* (2015.01)

(56) References Cited

U.S. PATENT DOCUMENTS

| | | | |
|---|---|---|---|
| 3,757,147 A * | 9/1973 | Lyman, Jr. | .................. 310/49.09 |
| 4,028,524 A | 6/1977 | Moll et al. | |
| 4,186,245 A | 1/1980 | Gilman | |
| 4,190,626 A | 2/1980 | Weyler, Jr. | |
| 4,652,780 A | 3/1987 | Murakami et al. | |
| 4,821,859 A | 4/1989 | Suchdev et al. | |
| 5,731,645 A | 3/1998 | Clifton et al. | |
| 5,864,303 A | 1/1999 | Rosen et al. | |
| 5,905,321 A | 5/1999 | Clifton et al. | |
| 6,029,538 A | 2/2000 | Little et al. | |
| 6,262,505 B1 | 7/2001 | Hockney et al. | |
| 6,269,895 B1 | 8/2001 | Tanuguchi et al. | |
| 6,388,347 B1 | 5/2002 | Blake et al. | |
| 6,566,775 B1 | 5/2003 | Fradella | |
| 6,630,761 B1 | 10/2003 | Gabrys | |
| 6,642,682 B1 | 11/2003 | Perkins et al. | |
| 6,707,187 B1 | 3/2004 | Gabrys | |
| 6,710,489 B1 | 3/2004 | Gabrys | |
| 7,531,931 B2 | 5/2009 | Hashiba et al. | |
| 7,679,245 B2 | 3/2010 | Brackett et al. | |
| 7,679,247 B2 | 3/2010 | Wang | |
| 7,750,518 B1 | 7/2010 | Perkins | |
| 7,946,181 B2 | 5/2011 | Kim et al. | |
| 8,053,940 B2 | 11/2011 | McCulley | |
| 8,242,649 B2 | 8/2012 | Fradella | |
| 8,368,271 B2 | 2/2013 | Wiggins | |
| 8,471,421 B2 | 6/2013 | McCulley | |
| 8,480,092 B2 * | 7/2013 | Hatch | ............ 277/569 |
| 8,482,174 B2 | 7/2013 | Filatov | |
| 8,776,635 B2 | 7/2014 | Morgan et al. | |
| 8,791,613 B2 * | 7/2014 | Wang | ............ 310/90.5 |
| 2005/0253051 A1 | 11/2005 | Hwang et al. | |
| 2006/0243839 A9 | 11/2006 | Barscevicius et al. | |
| 2007/0277644 A1 | 12/2007 | King et al. | |
| 2010/0171366 A1 | 7/2010 | Perkins | |
| 2010/0283340 A1 | 11/2010 | Fradella | |
| 2011/0031827 A1 * | 2/2011 | Gennesseaux | ............ 310/74 |
| 2011/0232415 A1 | 9/2011 | Early et al. | |
| 2012/0060644 A1 | 3/2012 | Morgan et al. | |
| 2012/0098370 A1 | 4/2012 | Pinneo et al. | |
| 2012/0217848 A1 * | 8/2012 | Holopainen et al. | ............ 310/410 |
| 2012/0299422 A1 * | 11/2012 | Filatov | ............ 310/90.5 |
| 2014/0055905 A1 | 2/2014 | Sanders | |
| 2014/0124172 A1 | 5/2014 | Veltri et al. | |
| 2015/0123505 A1 | 5/2015 | Kalev et al. | |

FOREIGN PATENT DOCUMENTS

| | | |
|---|---|---|
| JP | 57-177443 A | 11/1982 |
| JP | 58-214034 A | 12/1983 |
| JP | 4282050 A | 10/1992 |
| JP | 08-331814 A | 12/1996 |
| JP | 11-001715 A | 1/1999 |
| RU | 2082029 C1 | 6/1997 |
| RU | 2216842 C2 | 11/2003 |
| WO | WO-95/27326 A1 | 10/1995 |
| WO | WO-2014/020593 | 2/2014 |

* cited by examiner (a) Spin up stress distribution (at yield). Margin of safety = 0.

(b) Stress distribution on spinning past yield point (pre-conditioning phase)

(c) Residual stress state (d) Re-spin to speed of (a)

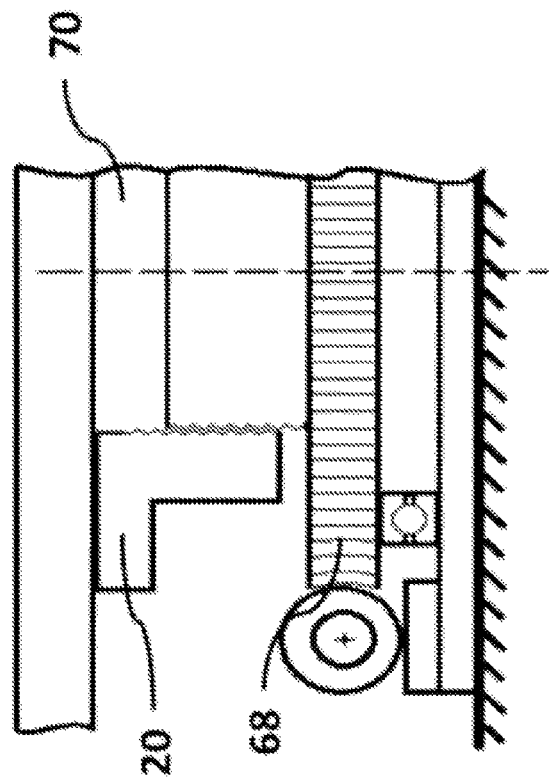
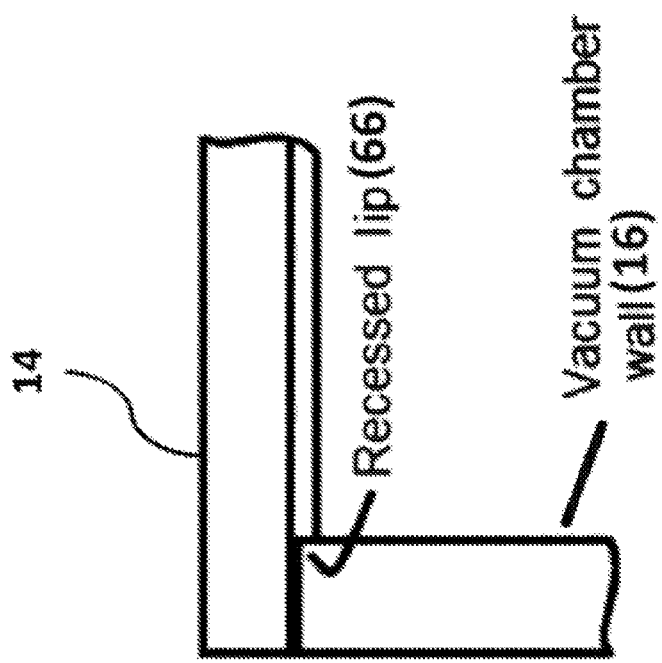
FIG. 9B
FIG. 9A

METHOD FOR PRODUCING A KINETIC ENERGY STORAGE SYSTEM

CROSS-REFERENCE TO RELATED APPLICATIONS

The present application claims the benefit of and priority to U.S. Provisional Patent Application No. 61/843,683, filed Jul. 8, 2013, which is incorporated herein by reference in its entirety.

BACKGROUND

The present disclosure relates generally to the field of kinetic energy storage. More specifically, it relates to flywheel energy storage for stationary applications where cost, is of high importance, in some cases, of higher importance than weight. These applications include frequency-regulation, time-of-use, uninterruptible power supply (UPS), demand response, and smoothing of renewable energy generation sources, among other applications.

Flywheels have been used as energy storage devices or for smoothing mechanical or electrical power for hundreds of years. Recently, there have been significant advancements in the field of flywheel energy storage because of the availability of high strength-to-weight (the specific strength) materials, like composites. The kinetic energy stored per unit mass of flywheel material can be shown to be directly proportional to the specific strength (strength divided by density) of the material. Because some composite materials have very high specific strength, composites make attractive candidates for flywheels having a high energy storage potential per unit mass. As an example, a high-strength carbon fiber composite (e.g., T700 at 70% volume fraction) has a fracture strength of 3430 mega-pascals (MPa), or 490,000 pounds per square inch (psi) and a density of 1845 kilograms per cubic meter (kg/m$^3$), or 0.067 pounds per cubic inch (lb/in$^3$). Compare that to a non-composite material, such as a high strength alloy steel, which has yield strength of 1400 MPa (200,000 psi) and density of 7870 kg/m$^3$ (0.285 lb/in$^3$). On a strength-to-weight basis, therefore, composites have more than ten times higher specific strength, and, therefore, are able to store more than ten times the energy per unit mass compared to steel. This potential has led inventors to pursue designing flywheels based on composite rotors.

However, composite materials have not been cost-effective in stationary applications (i.e., applications in which weight is not the primary concern) where the primary goal is maximum energy stored per unit cost, rather than maximum energy stored per unit weight.

SUMMARY

An exemplary embodiment relates to a material used for a flywheel rotor and a method used to manufacture the rotor with integral shafts. Some preferable materials include alloy steels that are heat treatable to a high level of strength while maintaining sufficient ductility to enable plastic flow. Steel alloys have a high strength-to-cost ratio in addition to low processing and fabrication cost. The rotor may be forged in multiple stages into a monolithic shape that can then be machined to form integral shafts. Examples of suitable steel alloys include AISI 4340, 4330, 17PH, M300, and other high strength alloys.

Another exemplary embodiment relates to the shape of the rotor. When a steel rotor is heat-treated the rotors that have a higher surface area will have a higher cooling rate. Since the cooling rate affects the material properties of the resulting steel, the shape of the rotor can impact the working characteristics of the rotor. In particular, a fast cooling rate is needed to produce the transformation into martensitic steel (a high-strength steel, desirable in flywheels). Therefore, a rotor shape that allows for faster cooling may also allow for rotor materials that have a higher proportion of martensitic steel. Specifically, a thin, disc-shaped rotor may be formable into a material with a higher proportion of martensitic steel than a cylinder-shaped rotor of the same volume prepared in the same way. In this situation, the disk may have a higher specific strength than the cylinder (because of the higher proportion of martensite) and, therefore, the disc-shaped flywheel will have a higher energy density. Since the two structures would cost the same to make, the disc-shaped rotor would be more cost-effective because of the higher energy density. A disk may also exhibit a more uniform hardness (proportional to strength) throughout the cross-section compared to a cylinder, because the cooling rate would be more uniform.

Another exemplary embodiment relates to the design of a rotor and to the use of conventional bearings with such a rotor. It can be shown that, for a given level of stored energy, a larger diameter of flywheel rotor results in a slower rotational speed. This slower speed allows a large-diameter rotor to be used with conventional, low-cost rolling contact bearings, which are highly reliable, economical, and easily maintained, rather than non-contact systems (e.g., magnetic levitation) that must be used in designs with high rotational speeds and are complex, expensive, require maintenance, and compromise reliability.

Another exemplary embodiment relates to a method for reducing the load on the bearings through the use of an off-loading electromagnet. An electromagnet is arranged such that it provides a vertical off-loading force that lifts the entire rotor against the upper bearings and partially off of the lower bearings, reducing the load on the lower bearings. Since bearing life is sharply reduced by increasing load, the off-loading feature of this embodiment results in a system with a very long bearing life compared to a non-lifted rotor system while employing low-cost bearings and a heavy rotor. As a specific embodiment, a 5-ton rotor may be lifted by a coil of approximately 0.75 meters (30 inches) in diameter, consisting of 3420 turns of 18 AWG size copper wire.

Another embodiment relates to the use of a load cell at the upper bearing to measure the load applied to it when the rotor is lifted by the electromagnet, and a method for using a control system that adjusts the electromagnet's field to ensure that the desired load is always applied to the bearings. In some embodiments, this load can be maintained at a very low value, resulting in long bearing life. For example, the load on the upper bearing during operation may only be 1.3 kN (300 lbs) and the capacity of the upper load cell may only be 2 kilo-newtons (kN) or 450 lbs for one implementation.

Another embodiment relates to the use of a control system to adjust the voltage applied to the electromagnet to ensure that the desired load is maintained. Load limits may be set at the controller to initiate appropriate actions should the electromagnet and/or the bearing malfunction. A feedback loop may then be employed from the load sensing and magnet voltage circuits to automatically maintain the correct load.

Another embodiment relates to a method in which a lower bearing is used as a touchdown bearing that is rated to support the full weight of the rotor for several hours in the event of failure of the off-loader.

In another embodiment, a load cell at the lower bearing measures the load applied to it. This is used to ensure that the desired load is applied at start-up and that changes in loading are detected in case the electromagnet fails during normal operation. This load cell is also connected to a control system such that appropriate actions can be initiated. In one implementation, a desired capacity of the lower load cell for a nominal rotor mass of 5 tons is 110 kN (25,000 lbs).

Another exemplary embodiment relates to the design of the off-loading magnet and its low power consumption. In this embodiment, a single coil of insulated copper wire provides a suitable lifting force while maintaining low power loss due to the provision for a sufficiently large cross-section for the magnetic flux. In a typical application, a coil 125 mm in width and 35 mm deep at an average diameter of 750 mm will provide an off-loading force of 50 kN at a power consumption of only 45 W.

Another embodiment relates to improving the reliability of the bearings and motor/generator through the use of seals to allow for operation of these components in air while the rotor spins in a vacuum. Since the high tip speeds of the rotor will result in air drag losses, the rotor is enclosed in a vacuum housing and operated in a vacuum. Rolling contact bearings, however, may not perform reliably for long periods in a vacuum due to outgassing of the lubricant and a tendency to form metal-to-metal welds in a vacuum due to the lack of oxide formation as wear progresses. Also, placing the motor/generator inside a vacuum makes it difficult to cool since heat must be conducted outside of the vacuum. In such configurations, expensive heat pipes and/or large conductive elements may need to be added to ensure adequate cooling. For liquid cooled motors, the piping carrying the coolant may need to penetrate the vacuum envelope through joints that are expensive and prone to leaking. In some embodiments, the upper and lower shafts of the rotor pass through the vacuum envelope via low-friction fluoropolymer lip seals. This design allows for the bearings and motor to be placed outside the vacuum envelope helping to make it easy and less expensive to cool, inspect, maintain, monitor, and replace, if necessary. At the low rotational speeds characteristic of a disk-shaped rotor, the power loss from the seals is small, for example, less than 50 W for 40 mm shaft seal rotating at 6000 rpm.

In another embodiment, the energy storage system is supported on seismic-rated supports to provide for lateral motion in an earthquake. Such seismic supports are used to support large buildings in earthquake-prone locations. This embodiment provides safe operation of the flywheel storage system if it should experience an earthquake.

Another embodiment relates to a method for increasing the energy density of the rotor by a pre-conditioning treatment that also serves as the proof test of the rotor before it is put into service. In the pre-conditioning process, the rotor is over-spun past the yield point of the material. Since the maximum tensile stress occurs at the center in a rotating disk of uniform thickness, yielding proceeds from the center toward the outside diameter. If, by this process, the yield zone grows to a desired radius (for example to about $1/\sqrt{2}$ of the rotor radius, which corresponds to half the volume of the disk), and the disk is subsequently slowed to zero, beneficial compressive stresses at the center of the disk. On rotating the disk again, the resulting stresses are lower than before the over-spinning pre-conditioning process because of these compressive residual stresses. On reaching the rotational speed at which yielding previously occurred, the new stress levels will be less than the yield stress, helping to increase the margin of safety. This pre-conditioning process, therefore, allows one to operate the disk at a speed corresponding to the yield strength, thereby increasing the energy density, while maintaining a positive margin of safety. Since the energy density (the kinetic energy stored per unit mass) is proportional to the square of the rotational speed, the increase in speed will increase energy density stored in the rotor.

Another embodiment relates to a method in which the surface of the disk is coated with a brittle paint that indicates the stress state in the rotor. The brittle paint has a very low threshold strain for brittle fracture and serves as an indicator of the magnitude of the stresses in the rotor and its distribution. As the rotor increases in speed, the strain corresponding to the rotor's stress state is recorded in the coating through a pattern of fine cracks. The spacing between the cracks is a measure of the stress; cracks closer together signify a higher state of stress than cracks further apart. By loading a tensile sample of the same material with the same coating, the crack spacing can be calibrated with respect to the stress. This technique helps one to estimate not only the magnitude and direction of the stresses experienced by the rotor, but also the stress distribution. These estimated values can be compared with analytical results to verify the fidelity of a computational model used in analysis of the rotor. In addition, the stress distribution obtained in this manner corresponds to each specific rotor that is tested. Thus, accurate statistics can be obtained on the manufacturing variability between rotors, helping to provide a quantitative measure of the reproducibility and reliability of the manufacturing process that was used to form the disk.

In another embodiment, an arrangement is described in which a video camera and a strobe light placed inside the vacuum envelope allows for real-time observation of the stress state in the rotor. The frequency of the strobe light is synchronized with the rotational speed of the rotor, facilitating real-time observation of the progression of the cracks in the brittle paint and, therefore, the stress distribution in the rotor. This capability may be useful for determining the relative margins of safety during operation of the system, particularly during the pre-conditioning process when an accurate measurement of the progression of the plastic zone with speed is essential.

Another embodiment relates to a method in which strain gages coupled with transmitters and receivers are used to monitor the stress state in the rotor. In this embodiment, strain gages are bonded to the surface of the rotor at locations of interest parallel and tangential to the radius vector. The addition of a telemetry transmitter to each strain gage allows one to read the strain in real time as the rotor rotates. A receiver inside the vacuum envelope and attached to the housing receives the strain gage reading and transmits it via a cable connected to a computer for display and recording. This arrangement provides real time measurement of the strain distribution in the rotor while it is rotating, information that may be particularly important during the pre-conditioning process since the stress distribution and the extent of the plastic zone can be accurately tracked with rotor speed.

Another embodiment relates to a method for reducing the precession-induced moment on a spinning rotor arising from the earth's rotation, while maintaining a high resonant frequency in the rotor/shaft arrangement. Thrust bearings alone are not adequate to absorb this moment at high rotational speeds. In an exemplary embodiment, the precession-induced moment on a spinning rotor arising from the earth's rotation is resisted by two angular contact bearings at the ends of the rotor shafts. The angular contact bearings provide axial support during operation and radial (or lateral) loading capability to resist precession-induced loads.

Another embodiment relates to an integrated vacuum housing and support structure for a flywheel rotor. Such an integrated housing may help to minimize the number of parts and reduce cost. The housing may be designed to maintain a vacuum in the space occupied by the rotor. To minimize cost and number of components, the vacuum chamber also serves as: the structure that supports the rotor; the alignment fixture for the shaft and bearings; and a suspension system for the rotor. The top plate of the vacuum envelope may also serve as a suspension element. During operation, the rotor is lifted by the electromagnet, which is integrated structurally into the top plate of the vacuum chamber. The stiffness of the top plate is designed so that, when the rotor is suspended, the minimum resonant frequency of the systems is at a value that is well below the operating speed range of the rotor. This arrangement helps to prevent fundamental resonances from occurring during normal operation of the system.

Another embodiment provides a method for adjusting the stiffness of the top plate by adding or removing radial rib stiffeners thereby providing a means for promoting resonances at the desired rotational speeds.

Another embodiment is a low-cost way for an accurately aligned system with tailored stiffness using three components: an upper plate, a lower plate, and a cylindrical section. By manufacturing the upper and lower plates from cast iron and the cylindrical section from a standard pipe section, one obtains an economical yet strong design. Ribs or stiffeners can be added or removed by welding to, or machining from, a basic cast iron form.

Another embodiment is a method for the use of dowel pins to accurately determine the relative position of the upper and lower plates of the three-component system.

Another embodiment is a method for the use of recessed lips in the upper and lower plates that seat at the ends of the cylindrical section to locate the upper and lower plates accurately with respect to each other.

In another embodiment, integral O-ring seal grooves at the two ends of the cylindrical section provide a low-cost mechanism for ensuring a leak-proof removable joint in the vacuum system.

In another embodiment, the electromagnet structure is integrated into the upper plate of the three-component system, resulting in an integrated structure that is multi-functional, being operable as both a housing for the coil, and a cross-section for the magnetic flux that is large enough to preclude saturation.

In another embodiment, a bearing/seal pack at each of the two bearing locations provides a convenient means to remove and inspect bearings without disassembling the system.

In another embodiment, the upper bearing pack has a means for accurately locating the axial position of the rotor shaft with respect to the air gap between the electromagnet and the rotor.

In another embodiment, the lower bearing pack has a means for accurately locating the axial position of the rotor with respect to the air gap between it and the electromagnet. With this embodiment, relative displacements between the upper and lower bearings resulting from deflections in the top and bottom plates due to rotor weight and/or vacuum pressure are compensated for such that there is adequate axial clearance between the bottom shaft stop and the lower bearing during operation.

In another embodiment, compact low-profile wavy springs ensure preloading the bearings in each bearing pack. A minimum axial preload is necessary to prevent ball-to-race sliding (instead of rolling) at high speeds which causes the temperature to rise, which in turn, can result in lubricant break-down leading to bearing failure.

In another embodiment, an actuator, such as a motor-driven worm gear, at the base of the unit provides a means for adjusting the axial position of the rotor remotely and autonomously when used in conjunction with a displacement transducer and a control system.

Another embodiment provides a means for lifting the rotor after initial assembly so that it is at the desired air gap to be magnetically held by the electromagnet. The application of vacuum to the inside of the sealed housing results in downward displacement of the top plate, and upward displacement of the bottom plate, due to the external atmospheric pressure. When the rotor is stationary and is resting on the lower plate, the force due to the external atmospheric pressure is sufficient to lift the rotor by deflecting the bottom plate such that the rotor shaft contacts the bearing stop at the upper bearing pack. This feature provides a means for achieving the desired air gap between the rotor and the magnet so that an adequate force to lift the rotor can be achieved. For example, a housing of 1.85 m (73 inches) in diameter will result in a force of 271 kN (61,600 lbs) applied downward on the top plate and the same force applied upward to the bottom plate. For a 5-ton rotor, resting on the bottom plate, this force is sufficient to lift the rotor at a pressure differential of about 20% of sea-level atmospheric pressure. By adjusting the level of vacuum, the amount of lift displacement of the rotor can be controlled. This embodiment is a low-cost yet effective means for positioning the rotor to enable it to be magnetically held prior to rotation.

Another embodiment describes a method for supporting the rotor. A hollow cylindrical structure located on the axis and at the bottom of the lower bearing pack acts as a single adjustable foot that supports the weight of the rotor when the off-loader is not activated.

Another embodiment describes the arrangement of several adjustable feet located below the bottom plate and under the cylindrical pipe section of the housing.

Another embodiment describes a method for seismic isolation of the system by adding discrete isolators at each foot.

Another embodiment describes a method for seismic isolation through the use of a continuous flexible support such as a thick rubber sheet placed under the bottom plate that allows for sliding as well as shear.

Another embodiment describes the use of non-contacting displacement sensors, such as capacitive gages, located on the inside of the vacuum chamber and spaced around the periphery of the rotor that measures the change in radius of the rotor with speed.

Another embodiment describes a means for determining and removing dynamic imbalances in the rotor. Accelerometers are mounted around the periphery of the bearing packs to measure the level of imbalance. The accelerometer signals are correlated with the motor rotary encoder for precisely determining the angular location of the net imbalance in the rotor. This information is used to remove a small amount of material at the periphery corresponding to the imbalance location to reduce or remove the imbalance.

Another embodiment describes the use of displacement gages to measure the axial displacement of the rotor relative to the structure. Displacement gages, such as extensometers, are mounted at the base of the unit within the bearing pack to record the dynamic (axial) motion of the suspended rotor over its entire operating and pre-conditioning speed ranges to determine the speeds at which the rotor experiences each resonant mode. This embodiment provides the axial component of the displacement alone, which is valuable since one is able to characterize the axial component of the dynamic response of the suspended rotor over various operational modes.

In another embodiment, temperature sensors are placed adjacent to or on the outer races of the upper and lower bearings to monitor temperature changes that may signal potential failure and/or wear.

In another embodiment, a torque noise sensor is placed beneath the upper and/or lower bearing. The signal from this sensor, when compared with the signal from the torque transducer at the motor-to-rotor coupling, is a measure of wear in the bearing and provides for early detection of a potential bearing failure.

In another embodiment, acoustic emission (AE) sensors are placed on the structure at several locations including at the bearing packs and inside the vacuum housing. The transducers are in close contact with the structural elements via gel or grease acoustic coupling media.

In another embodiment, individual or bundles of ultra-high modulus (UHM) carbon fiber are bonded (or otherwise attached) tangentially and radially to the rotor surface at various radial distances from the rotor axis. Since the failure strain of UHM carbon fiber is low ($\sim 1000 \times 10^{-6}$) relative to strains experienced by the rotor when spinning ($\sim 5000 \times 10^{-6}$), the individual fibers will begin to fail as the strain in the rotor increases with speed. Fiber failures have a characteristic AE signature, which can be detected by an AE sensor (for example, a 500 kHz sensor) bonded to the structure near the rotor bearing location. This embodiment provides a means to determine the strains in the rotor remotely while within the vacuum envelope. The method can be used in other applications where strain gages or other methods cannot be used, for example, in hostile environments, such as high temperature and/or oxidative and corrosive atmospheres. Other fibers such as mineral, glass and polymer fibers may also be similarly employed for different levels of failure strain capacity.

Another embodiment describes a means for efficient energy absorption in the event of rotor burst failure. A buried thick-walled steel and concrete containment structure is constructed in close proximity, and preferably, in contact with the outside cylinder wall of the housing. This arrangement keeps fragments from rotor failure to be contained while still in rotational modes (minimizing translational modes) so that energy dissipation is facilitated by friction and particle-to-particle interaction.

In another embodiment, the containment structure is constructed with a tapered geometry such that the diameter of the containment structure increases gradually with increasing depth from the bottom of the unit. At rotor failure, the fragments will tend to displace axially downward and be collected below the unit rather than move upward and be ejected above the surface.

In another embodiment, an arrangement of graded aggregate is placed such that aggregate size decreases with radial distance from the concrete wall. This results in an energy absorbing structure with larger porosity adjacent to the concrete containment structure where, crushing and compaction of the aggregate provides energy absorption. At increasing radial distance the decreasing size of the aggregate approaches that of sand particles that are also arranged with decreasing particle size with increasing radial distance. In this zone, fragment motion is resisted by friction with the sand particles.

In another embodiment, bearing packs each including an accurately aligned bearing/seal/load cell assembly are contained in housings that are provided with dowel pins or locating features that accurately locate the axis of each with respect to the housing axis and, therefore, with each other.

In another embodiment, control software provides for safe operation of the system over its various modes of operation: pre-conditioning, speed cycling, power cycling, demand response, time-of-use, and other strategies for maximizing the benefits of storage with respect to the grid and/or other generating sources such as renewables (solar, wind, tidal) and/or diesel or gas-powered generators.

In another embodiment, control logic is incorporated in the control software for safe and efficient operation under various potential failure scenarios including, but not limited to, failures of the motor/generator, bearings, off-loader, vacuum pump, cooling systems, seismic events, and temperature spikes.

In another embodiment, the rotor is connected to an electronic or mechanically controlled continuously variable transmission (CVT) or other geared transmission such that the varying speed of the rotor is output to an induction motor. Over-driving the induction motor in this fashion past the slip speed results in power output while under-driving it will result in the induction motor being driven by the external power source to store kinetic energy in the rotor by increasing its speed to its maximum rated value. This is a low-cost method for energy storage and delivery since it does not involve brushless DC motors and their associated control and driver software schemes.

In another embodiment, a radial temperature gradient is maintained along the rotor radius. When the center of the rotor is at a higher temperature than its periphery, a non-uniform thermal strain is created that results in a beneficial thermal stress (compressive at the center, tensile at the periphery), which improves the overall stress state and thereby increases the energy density in the rotor.

In another embodiment, the geometry of the rotor is a simple fixed or variable thickness disk without shafts. Shafts are machined separately from alloy steel that may be austenitic (and, therefore, non-magnetic) and bonded to the disk. Since the rotor is lifted directly by the magnetic off-loader, the stresses in the bond joints are low and primarily compressive, due to the axial compressive preload, and are easily accommodated by the bond strengths of conventional polymer structural adhesives.

In another embodiment, the rotor is a simple fixed or variable thickness disk without shafts. Shafts are machined separately from alloy steel that may be austenitic (and, therefore, non-magnetic) and welded to the disk. Following the welding operation, conventional heat treatment procedures remove stress concentrations introduced into the rotor at the weld locations. The magnetic off-loader lifts the rotor directly and not by its shafts, thus, the stresses in the welds are low.

In another embodiment, the rotor is made as a simple fixed or variable thickness disk without shafts. Shafts are machined separately from alloy steel that may be austenitic (and, therefore, non-magnetic). The shafts are friction-welded to the disk by spinning them up to a high speed and then axially pressing them onto the disk. Following the friction-welding operation, conventional heat treatment procedures remove any stress concentrations introduced into the rotor at the friction-welds. Since the rotor mass is lifted by the magnetic off-loader, the stresses in the welds are low.

In another embodiment, the rotor includes several laminated plates that are adhesively bonded together using conventional structural adhesives. The only stress in the joints between the laminations is gravity loading which occurs when the rotor is lifted. This stress is low and easily accommodated by the adhesive tensile strength. For example, for ten laminations each 25 mm in thickness (1 inch), the tensile stress in the first lamination joint (the most highly loaded bonded joint) is less than 0.021 MPa (3 psi). Structural adhesives have tensile strengths readily exceeding 7 MPa (1000 psi). Thin laminas can be individually heat-treated to higher strengths thereby increasing the rotor energy density. In addition, laminated rotors have a high degree of redundancy since flaw propagation in one lamina tends to be restricted by the adjacent laminas. In addition, failure of one lamina does not result in failure of the entire rotor. Also, since the laminas are thin, they are in a state of biaxial plane stress when the rotor is spinning, a more uniform stress state corresponding to a higher energy density, than the biaxial plane strain state that exists in a thick monolithic rotor.

In another embodiment, the materials used in each lamination may be different for a fail-safe failure mode. For example, the laminations adjacent to the shafts may be made from a ductile yet relatively lower strength steel since fracture of the shaft-to-rotor failure would be catastrophic. The inner laminations may be made from a higher strength steel whose failure would be detectable and would not be catastrophic.

Another embodiment describes the use of permanent magnets instead of electromagnets. This arrangement is a more reliable, less expensive, and less complex off-loading scheme, since the power supply, coil, leads and feed-through connections are not required.

In another embodiment, a remotely controlled actuator establishes an adjustable and controllable air-gap between the rotor and the permanent magnet off-loader.

In another embodiment, the air-gap between the rotor and the electromagnetic or permanent magnet off-loader is maintained through feedback from the load cell that measures the lifting magnet forces. This arrangement provides closed loop control of lift loads that may vary due to dynamics, wear, and temperature variations during operation.

In another embodiment, single or multiple coupled DC motor/generators powered by DC power from two inverters mounted on the downstream end of a bidirectional controller connected to the grid at 460V, 3 phase (or other distribution voltages) is a low-cost scheme for energy storage at grid-scale. The arrangement provides modularity in both energy storage and power. For example, a 150 kWh capacity flywheel coupled with a 30 kW motor/generator can deliver 30 kW continuously for 5 hours to take advantage of differential pricing for time-of-use storage. For demand response and higher power, short time, applications, a motor/generator of 150 kW rating can be readily substituted to deliver 150 kW for 1 hour. The addition of a second 150 kW motor/generator at the bottom shaft location doubles the power rating by supplying 300 kW power for 30 minutes.

Another embodiment relates to a method for high-speed manufacture of composite rotors. In this embodiment, a composite fiber-reinforced ring is manufactured using a high-speed rotating cylindrical mold into which is fed a fiber bundle from a rotating spool located inside the mold. The spin axis of the fiber-dispensing spool is parallel to the rotating mold axis. As the fiber bundle is unwound from the spool, it is held against the inside surface of the rotating mold by centrifugal force. Room temperature curing pre-catalyzed thermosetting resin is sprayed from a nozzle perpendicular to the vertical wall of the rotating mold onto the fiber bundle lying against the wall. The high g-force provides adequate pressure for the liquid resin to infiltrate the fiber bundle as curing of the resin proceeds. When the cure is complete, the mold is stopped and the ring ejected from the mold. This process is 10 to 50 times faster than filament winding, the conventional process for manufacturing composite rings. For example, fiber dispensing rates of 4,500 m/min are possible with this arrangement compared to filament winding rates of 60-90 m/min. Alternatively, a resin system that cures at elevated temperature may be used, together with a method for heating the mold surface either by internal electrical resistance heaters, gas fired heaters, or infrared lamps illuminating the mold from the inside. Alternatively, the rotating mold has a central shaft and shaft lip seals so that infiltration and curing is done in vacuum to minimize voids in the composite. Additional spools may be simultaneously deployed such that processing times can be further reduced and/or different fibers or wires (glass, carbon, Kevlar, polymers, metal wires, etc.) can be dispensed simultaneously or in sequence such that the final composite ring has a layered or mixed configuration of different fiber types, which may be advantageous for certain applications. Alternatively, different resin systems can be applied in sequence to vary properties radially. For example, a composite ring can be readily fabricated in this manner with carbon fibers at its outside diameter and glass fibers at its inside diameter. Due to the high g-loading in this embodiment, for example, 300 g's in a 2 m diameter mold rotating at 520 rpm, void-free composite rings can be produced at high rates.

In another embodiment, a metal wire coil is manufactured using a high-speed rotating cylindrical mold into which is fed a metal wire, such as copper wire, dispensed from a rotating spool located inside the mold whose spin axis is parallel to the rotating mold axis. As the fiber bundle is unwound from the spool, it is held against the inside surface of the rotating mold by centrifugal force. Room temperature curing pre-catalyzed potting resin is sprayed from a nozzle perpendicular to the vertical wall to pot the coil for use as an electromagnet coil, for electric motors, or other electrical devices.

Another embodiment describes a method for making a composite ring using a pre-impregnated fiber bundle, or tow-preg, that is dispensed into a high-speed rotating cylindrical mold a rotating spool located inside the mold whose spin axis is parallel to the rotating mold axis. As the fiber bundle is unwound from the spool, it is held against the inside surface of the rotating mold by centrifugal force. Infrared, hot air, or other types of heaters provide the heat for curing the matrix polymer in the tow-preg. As before, various fibers and/or metal wires can be dispensed in this manner, simultaneously or sequentially.

BRIEF DESCRIPTION OF THE DRAWINGS

The exemplary embodiments will be explained in more detail in the following text with reference to the attached drawings, in which:

FIG. 9A is a schematic drawing showing how the top plate (and upper bearing) may be accurately located with respect to the bottom plate (and lower bearing) through a machined recessed lip for precise alignment of the rotor axis.

FIG. 9B is a schematic drawing showing how the lower central support may be raised or lowered to maintain the desired air gap between the rotor and the lifting off-loading magnet by employing a motor-driven mechanism supported on thrust bearings.

DETAILED DESCRIPTION

With reference to the accompanying FIGURES, the present disclosure relates to kinetic energy storage, specifically flywheel-based energy storage, for use in electrical grids, renewable energy generation systems such as wind turbines, solar panels, tidal machines, and industrial applications where smoothing of power demand reduces both capital and operational costs. The present disclosure also relates to methods of producing, controlling, and integrating such storage devices with existing grid and micro-grid energy distribution systems. While the subject matter herein is presented in the context of energy storage devices in the field of grid-scale applications, such devices may be utilized in alternate applications such as stand-alone energy storage for electric vehicle charging stations, rail transportation systems, elevators, cranes, shipboard systems, or any other devices utilizing kinetic energy storage, as will be appreciated by those of skill in the art who review this disclosure.

Figure 1:
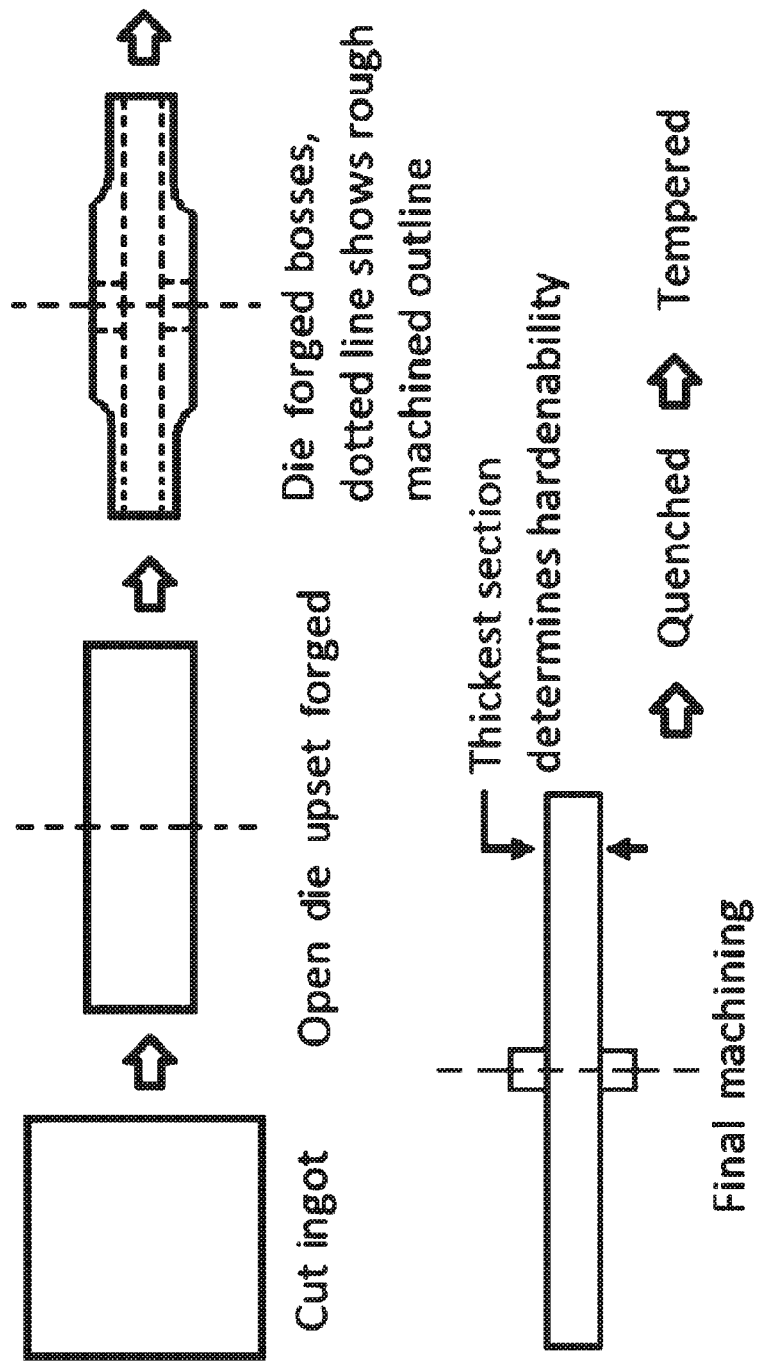
FIG. 1 is a process flow drawing showing a sequence of processing steps for the manufacture of a high energy density rotor at low cost.

Referring to FIG. 1, an exemplary sequence of metal forming operations is shown for producing a rotor with the desired strength and uniformity at low cost. The rotor may be one of the most expensive components in the design of the energy storage device disclosed herein. It may be of constant or variable thickness. When rotating at high speed, the stresses in a constant thickness rotor are at a maximum at its center where the radial and tangential stresses are both tensile. Structural integrity at the center is, therefore, more important than material integrity at the edges, since flaws are more likely to initiate and propagate at the center of the rotor. The manufacturing sequence shown in FIG. 1 is a method for helping to reduce the size of the flaws in an economical and reproducible manner.

A cast ingot of the desired alloy, for example, American Iron and Steel Institute (AISI) designation 4340, is cut to the desired volume and subjected to one or more upsetting operations in an open die set-up in a hydraulic press at the hot forging temperature. This process compresses voids in the ingot and stretches inclusions into thin and finer particles called stringers. Since the loading is axisymmetric, the process may also result in dispersion of stringers. In an exemplary embodiment, the blank is further hot-forged into a shape containing bosses on either surface using a closed-die set of tools. In some embodiments, the heights of the bosses exceed the final heights of the integral shafts of the rotor. The bosses may be of different heights for specific applications. Following this operation, the rotor is now almost in its final shape. This shape may present a relatively thin cross-section for rapid and uniform cooling during the quench operation in the heat treatment process.

Transformation-hardening steel alloys such as AISI 4340 depend upon a minimum cooling rate for the formation of martensite which, after the tempering process determines the strength and ductility of the final product. The minimum cooling rate occurs in the thickest location of the cross-section farthest from the surface. Thus, the design of the rotor, for maximum energy storage density capacity at minimum cost, depends upon a low aspect ratio (thickness-to-diameter ratio). In one example, an aspect ratio of about 15% results in a thickness of 0.25 m (10 inches) for a maximum energy storage capacity of 150 kWh when AISI 4340 heat-treated alloy steel is used. In other embodiments, thicknesses of less than 0.25 m may be used (e.g., thickness in the range of 0.05 m-0.25 m).

Following the closed-die operation to form the bosses, the blank is rough-machined to further reduce the maximum thickness in the blank. This process may be followed by quenching and tempering (heat-treating). An exemplary quenching is to heat the blank to 850 C, quench in a polymer-modified water bath, followed by tempering at 210-250 C. Following the quenching operation, the part is finish-machined and balanced. Such a process sequence may result in a minimum yield strength of about 1200 MPa (170,000 psi), ultimate tensile strength of about 1300 MPa (185,000 psi), and ductility of at least 6% for an exemplary rotor of the dimensions discussed above. It may be important to ensure adequate ductility so that the rotor, when subjected to the pre-conditioning process disclosed below, will have the desired beneficial residual stress state that improves energy density and ensures adequate margins of safety.

Figure 2:
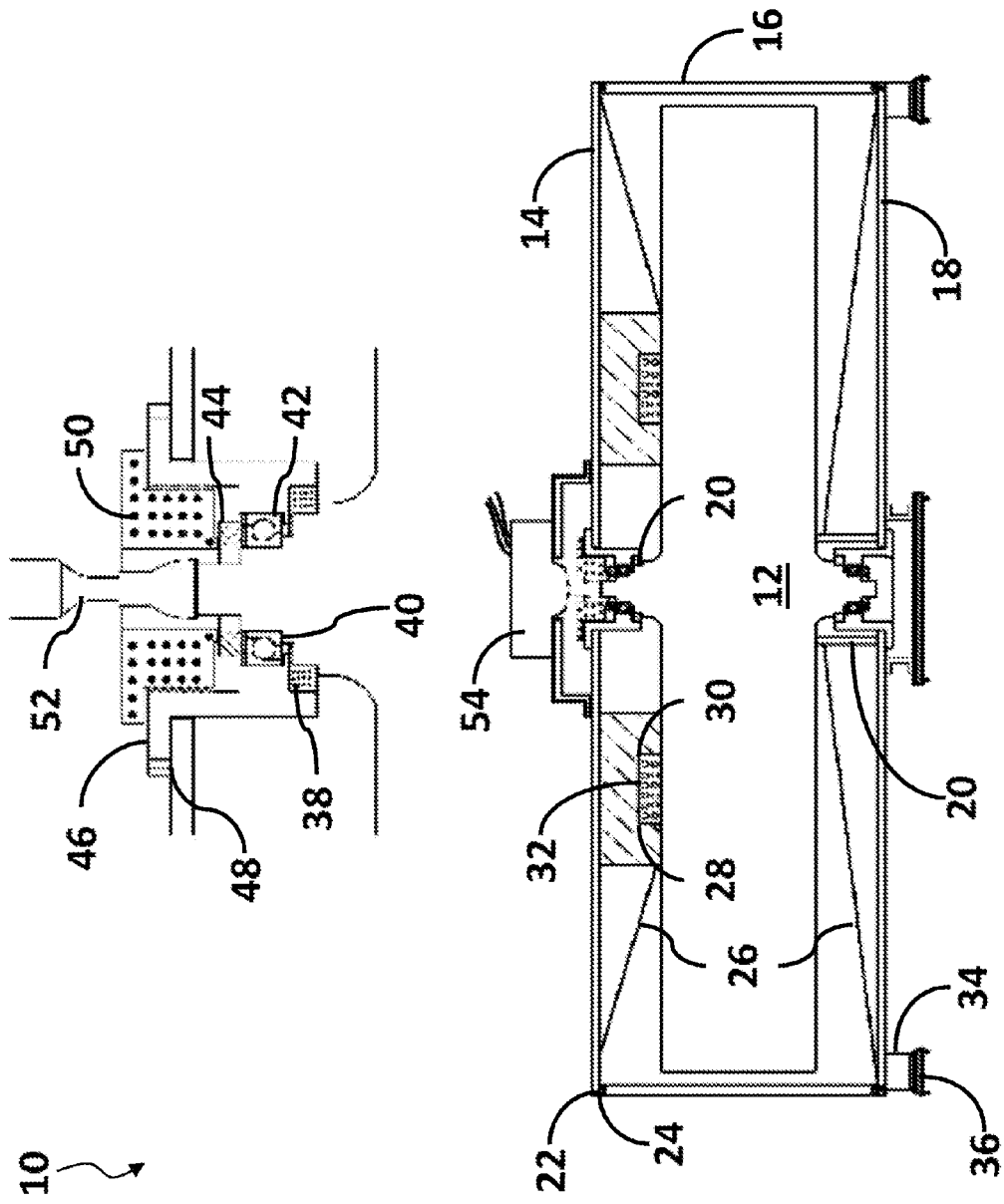
FIG. 2 is a schematic drawing showing a kinetic energy storage device in the form of a spinning rotor supported by bearings inside a vacuum envelope and driven by an external motor/generator.

Referring to FIG. 2, a system 10 shows a flywheel energy storage device that includes a rotor 12 that is located within a hermetically sealed housing including a top plate 14, a cylindrical vertical enclosure 16, and a bottom plate 18. Two bearing packs 20 allow the rotor to rotate freely in rolling contact with the bearings held within each bearing pack. Dowel pins 22 accurately locate the upper and lower plates with respect to each other. O-ring seals 24 in the cylindrical enclosure 16 seal the top and bottom plates to form the vacuum enclosure. Ribs 26 in the top and bottom plates provide the desired level of stiffness to each plate. An electromagnet 28 in close proximity to the top surface of the rotor provides a vertical force large enough to lift the rotor. An annular slot 30 whose axis coincides with the axis of the rotor is cut into the body of the electromagnet. The annular slot is filled with a copper coil 32 including several coils of a single insulated wire which, when connected to a DC power supply will provide a controllable lifting force on the rotor.

A series of externally mounted feet 34 support the device on a pad 36 including a number of bonded and laminated steel/rubber layers that provide isolation to the device from seismic events. The bearing pack 20 contains a lip seal 38 that seals the rotating shaft against air infiltrating into the vacuum envelope. A wavy spring 40 ensures that a minimum axial preload exists on the rolling contact bearing 42 and a load cell 44 provides a means for tracking the axial load on the bearing during operation. The shaft of the rotor 12 has a series of steps machined into it to accommodate the seal, spring, bearing, and load cell. The bearing pack outer housing 46 is located accurately on the top plate via dowels 48. The axial position of the shaft is adjusted by an internally threaded hollow cylindrical insert 50 which, when rotated establishes the upper set point that locates the load cell's (and, therefore, the shaft's) axial position. This feature provides a means for adjustment of the air gap between the top surface of the rotor 12 and the electromagnet 20. A coupling shaft 52 connects the top of the rotor shaft to the motor/generator 54.

Figure 3A:
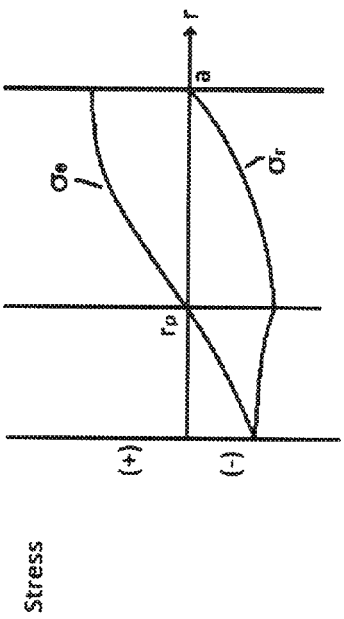
FIGS. 3A-D show plots of the beneficial effect of pre-conditioning on the stress state in the rotor.
Figure 3B:
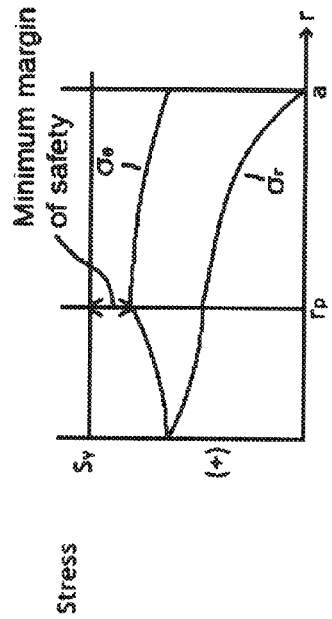
Figure 3C:
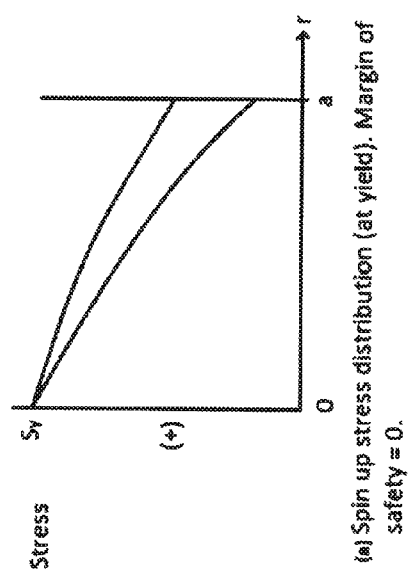
Figure 3D:
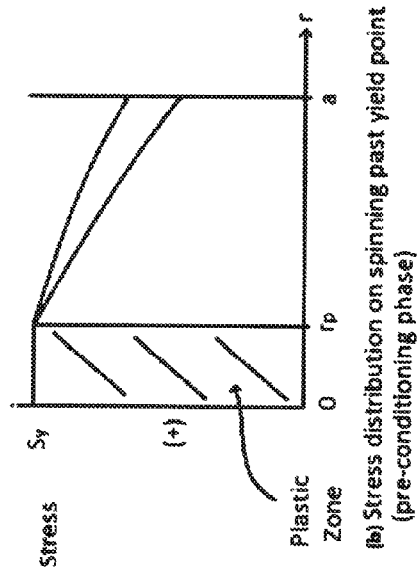

FIGS. 3A-D shows plots of the stress distribution in the rotor when a pre-conditioning treatment as disclosed below is performed on the rotor. FIG. 3A shows the stress distribution (radial and tangential stresses) in a rotor spinning at a speed at which yielding just begins to occur at the center of the rotor. This point is considered to be the maximum level of loading for the rotor and its maximum operating speed is usually set to a value well below this value. However, increasing the rotor speed above the point corresponding to the initiation of yield creates a plastic zone that grows as shown in FIG. 3B to a radius $r_p$. On reducing the rotor speed to zero, a residual stress state now exists as shown in FIG. 3C, which is characterized by a central compressive zone. On re-spinning the rotor to the speed reached in FIG. 3A, the residual compressive zone reduces the maximum stress so that a positive margin now exists at the speed corresponding to the yield speed. This pre-conditioning process thus increases the energy storage density in the rotor.

In some embodiments, the rotor strain may be estimated using computational models. In such an embodiment, the desired amount of strain may be converted to the rotation speed for a given rotor material and geometry. In this way, a sufficient amount of strain would simply be a given spin speed, without actually measuring the strain in each rotor. In other cases, as will be shown, the strain may be measured while spinning is carried out such that the strain may be determined and the spinning speed may be increased until the desired yielded zone is produced.

Figures 4A, 4B:
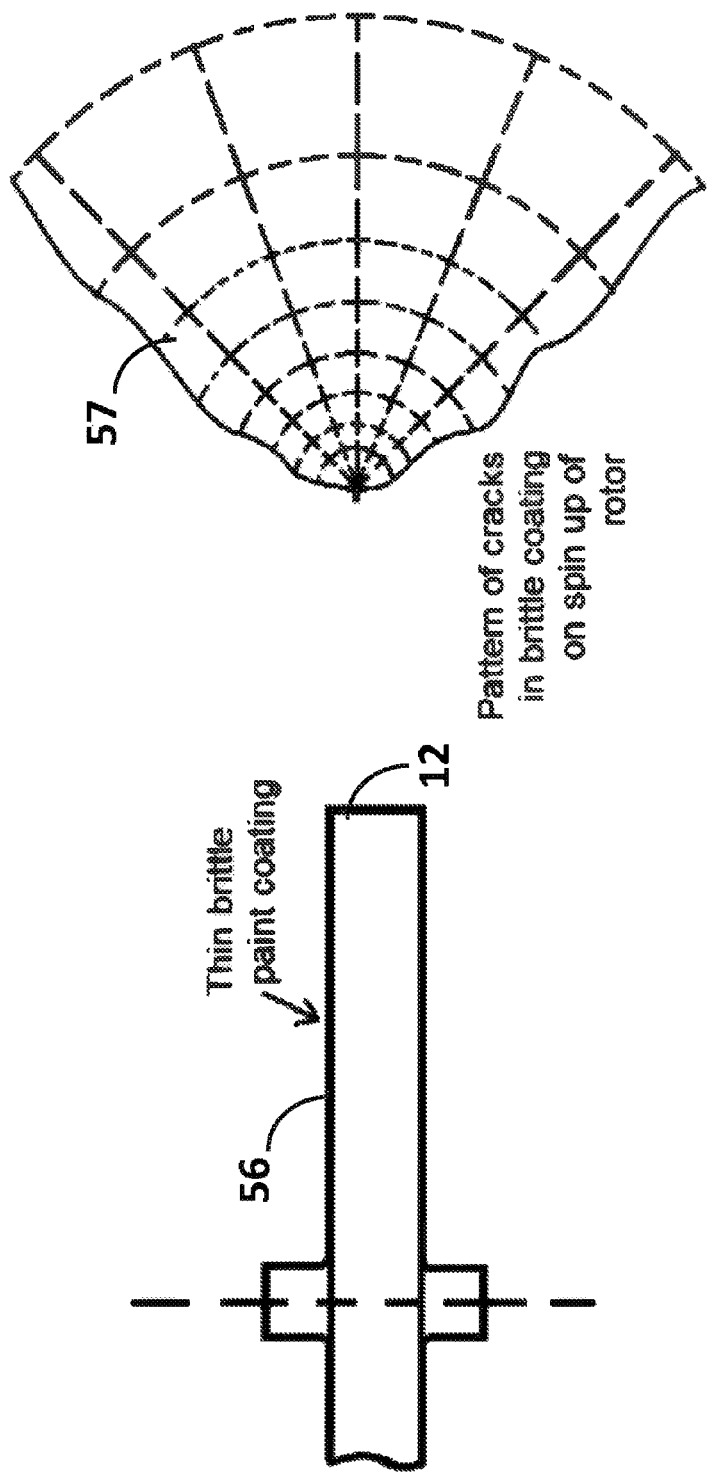
FIG. 4A is a schematic drawing showing the use of a brittle paint coating for determining the stress state in the rotor.
FIG. 4B is an example pattern of cracks in the brittle paint coating, the cracks resulting from spin up of the rotor.

FIG. 4A shows the application of a brittle paint 56 onto the rotor 12. On spinning up the rotor, the strain in the rotor produces a crack pattern 57, shown in FIG. 4B, in the brittle paint that represents the stress state in the rotor. The crack pattern includes tangential and radially distributed cracks whose spacing is a measure of the magnitude of the stress; the closer the spacing the larger the stress. Quantitative values of the stress distribution can be obtained through calibration from loading a tensile specimen to known loads and measuring the crack pattern. In addition to the magnitude of the stresses, the directions of the principal stresses are also displayed in the pattern since the orientations of the cracks are perpendicular to the principal stress directions.

Figure 5:
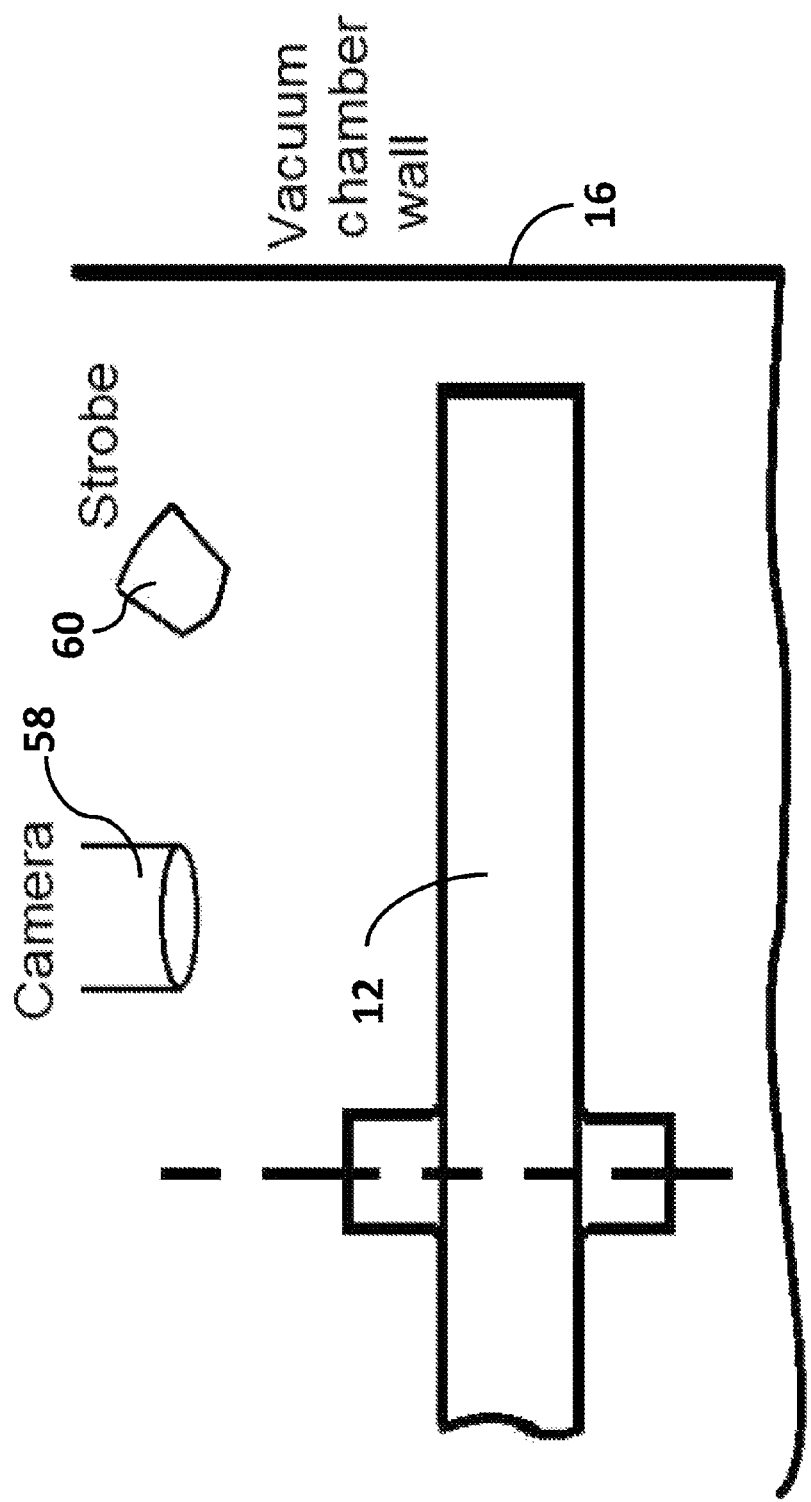
FIG. 5 is a schematic drawing showing an arrangement of a video camera coupled with a strobe light for obtaining images of the crack patterns in the brittle paint coating while the rotor is spinning.

FIG. 5 illustrates the use of a video camera 58 and a strobe light 60 whose frequency is synchronized with the rotor speed. In this manner, the progression of the cracks in the brittle paint layer on the rotor 12 within the vacuum envelope 16 can be recorded as a function of rotor speed.

Figure 6:
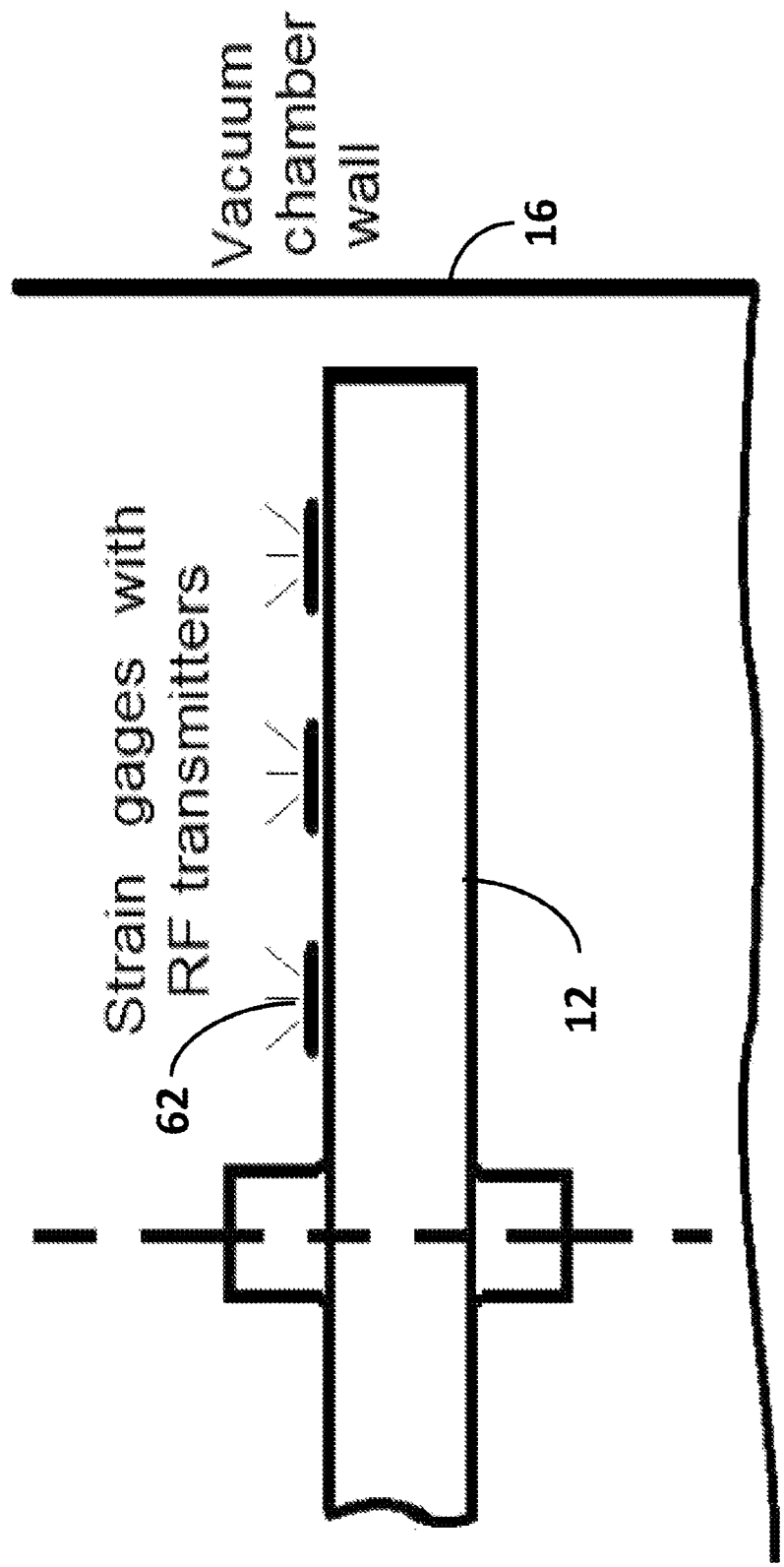
FIG. 6 is a schematic drawing showing an arrangement of strain gages connected to radio frequency transmission circuits and antennas for determining the strains in the rotor while it is spinning.

In FIG. 6, strain gages with radio-frequency (RF) transmitters 62 are bonded to the surface of the rotor 12 inside the vacuum chamber wall 16 and oriented along directions of interest parallel and tangential to the radial vector. A receiver inside the vacuum envelope communicates the strain gage readings to a recorder via a cable for display and recording. This arrangement provides real time measurement of the strain distribution on the rotor while it is rotating, information that is particularly important during the pre-conditioning process, since the stress distribution and the extent of the plastic zone is accurately tracked with rotor speed. In addition, control software can use this information to warn of responses that are not nominal, and shut down the unit, if necessary.

Figure 7:
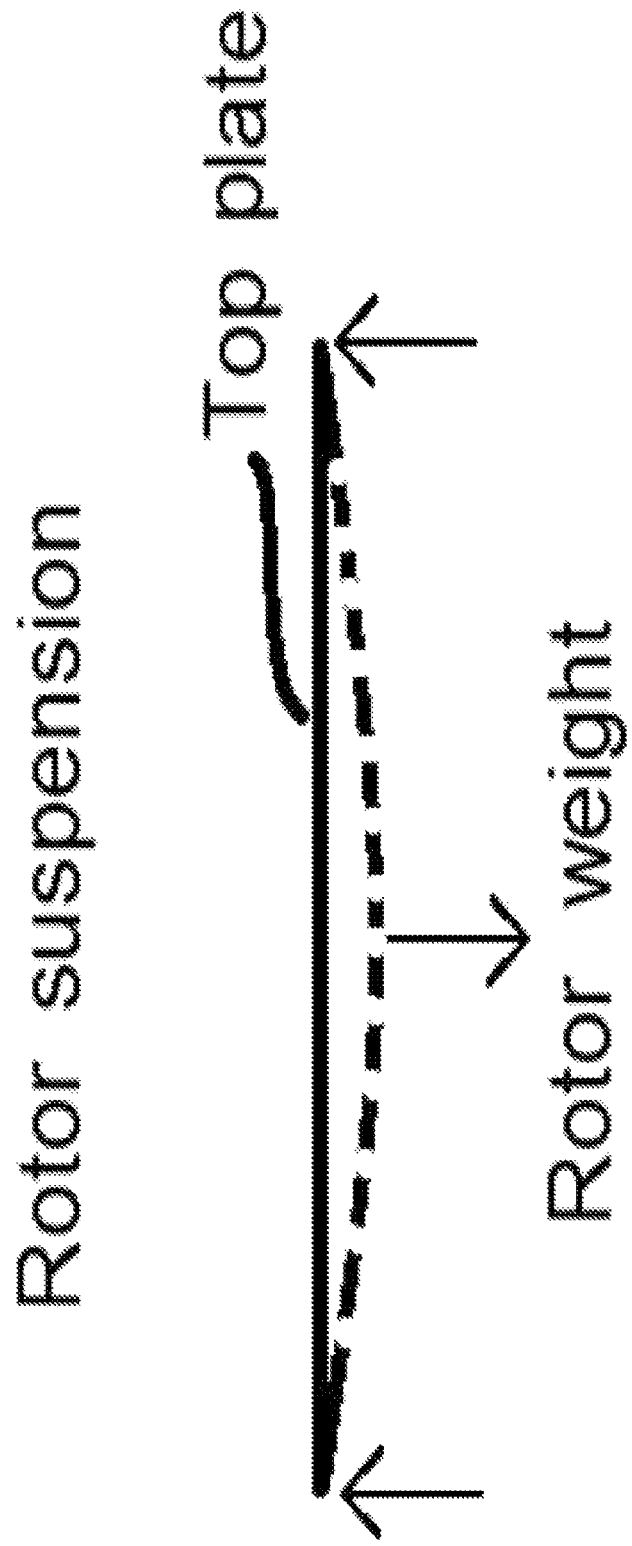
FIG. 7 is a schematic drawing showing us of the top plate of the vacuum housing as an elastic suspension element of the rotor.
Figure 8:
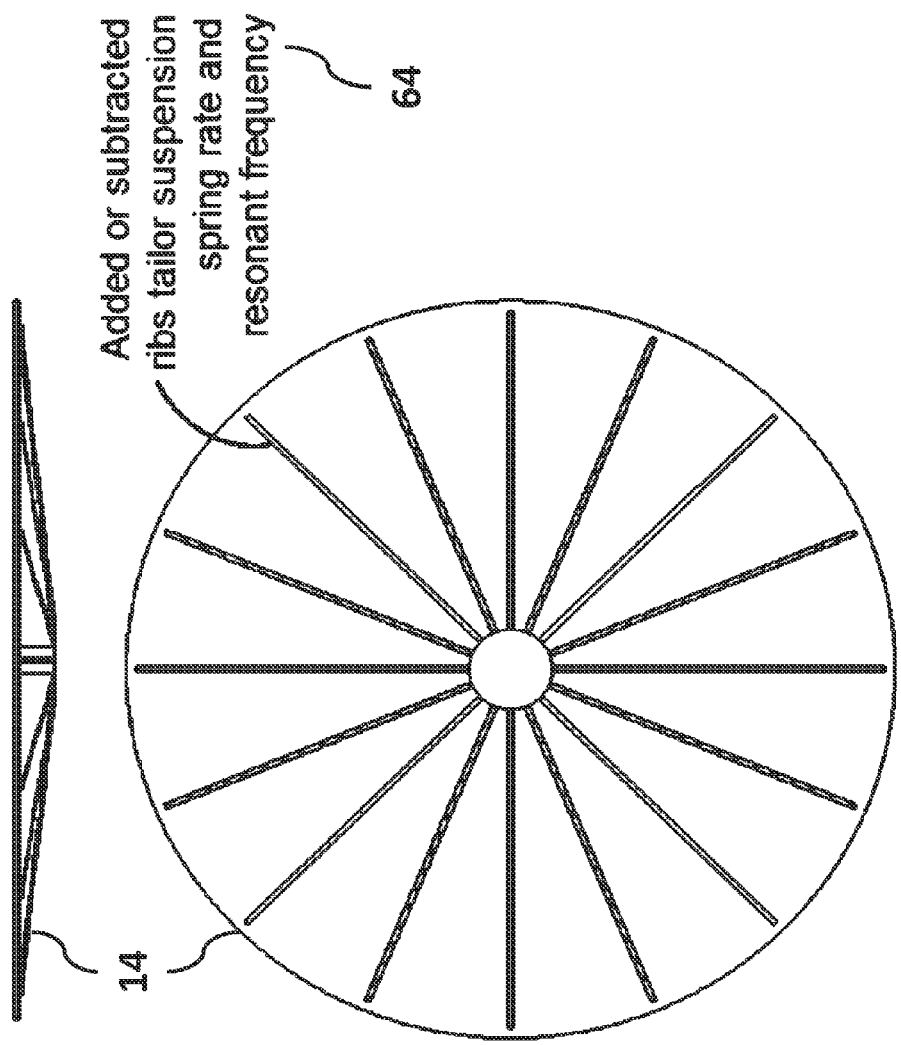
FIG. 8 is a schematic drawing showing stiffening ribs in a top plate, which acts as a suspension element of the rotor, the added or removed ribs altering the stiffness of the top plate and, therefore, the resonant frequency of the rotor suspension system.

FIG. 7 is a sketch that illustrates the use of the elastic response of the top plate from which the rotor is suspended as a spring that determines the minimum resonant frequency of the system. The weight of the rotor deflects the top plate depending upon its stiffness. The resonant frequency is proportional to the square root of the ratio of the plate stiffness (the rotor weight divided by the deflection of the plate, shown as the dotted line in the figure) to the rotor weight. Thus, if the stiffness of the top plate can be adjusted, one can obtain a desired resonant frequency of the system. This feature is illustrated in FIG. 8, which shows how the stiffness of the top plate 14 can be adjusted by adding or removing rib stiffeners 64. The lateral loads depend, for a given rotor speed, on the lengths of the rotor shafts, with the load decreasing with increasing shaft length. The resonant frequency of the first-bending mode of the rotor/shaft structure, however, increases with decreasing shaft length. While the resonant frequency decreases with shaft length as $L^{3/2}$, it increases with shaft diameter as $d^2$. Thus, a suitable ratio of the shaft diameter to length provides a system that has both low lateral loading on the bearings from rotor precession as well as high resonant frequency.

Referring to FIG. 9A, a recessed lip 66 in the top plate 14 accurately locates it with respect to the vacuum chamber wall 16. This feature, also present in the bottom plate, ensures that the alignment between the top and bottom bearing packs is accurate.

Referring to FIG. 9B, a worm gear 68 is used to accurately locate the axial position of the bearing pack 20 and, therefore, the rotor with respect to the air gap between it and the electromagnet. The worm gear is driven by a motor (not shown), or manually, to rotate the output shaft 70, which, by virtue of a screw mating with the bearing pack, lifts or lowers the entire assembly. With this embodiment, relative displacements between the upper and lower bearings due to deflections in the top and bottom plates resulting from rotor weight and/or vacuum pressure are compensated for such that there is adequate axial clearance between the bottom shaft stop and the lower bearing during operation. These adjustments can be carried out remotely and, if necessary, autonomously when used in conjunction with a displacement transducer and controller.

Figure 10:
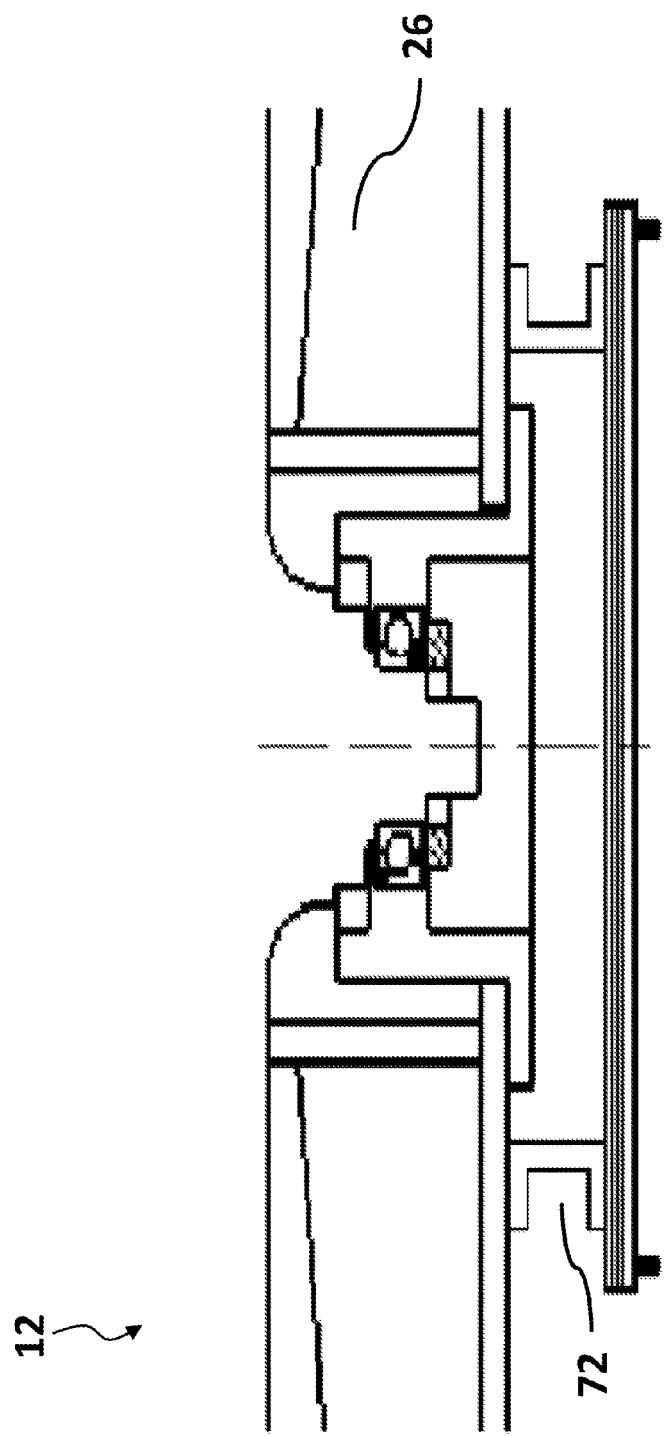
FIG. 10 is a schematic drawing showing details of the central support foot.

Referring to FIG. 10, a hollow cylindrical structure 72 located on the axis and at the bottom of the lower bearing pack acts as a single adjustable foot that supports the bottom plate 26 when the rotor 12 is stationary and/or the off-loader is not activated.

Figure 11:
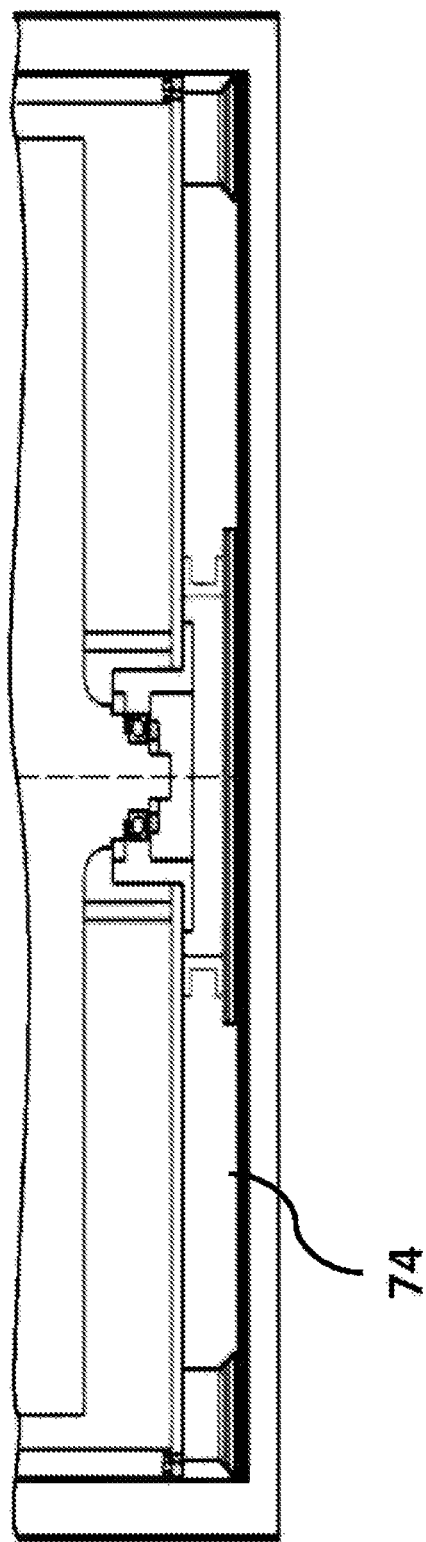
FIG. 11 is a schematic drawing showing the use of a rubber or elastomer-based sheet for providing seismic isolation to the unit.

Referring to FIG. 11, the entire unit is placed on a thick rubber sheet, or a laminated assembly of steel plates and rubber sheets 74 to provide seismic isolation.

Figure 12:
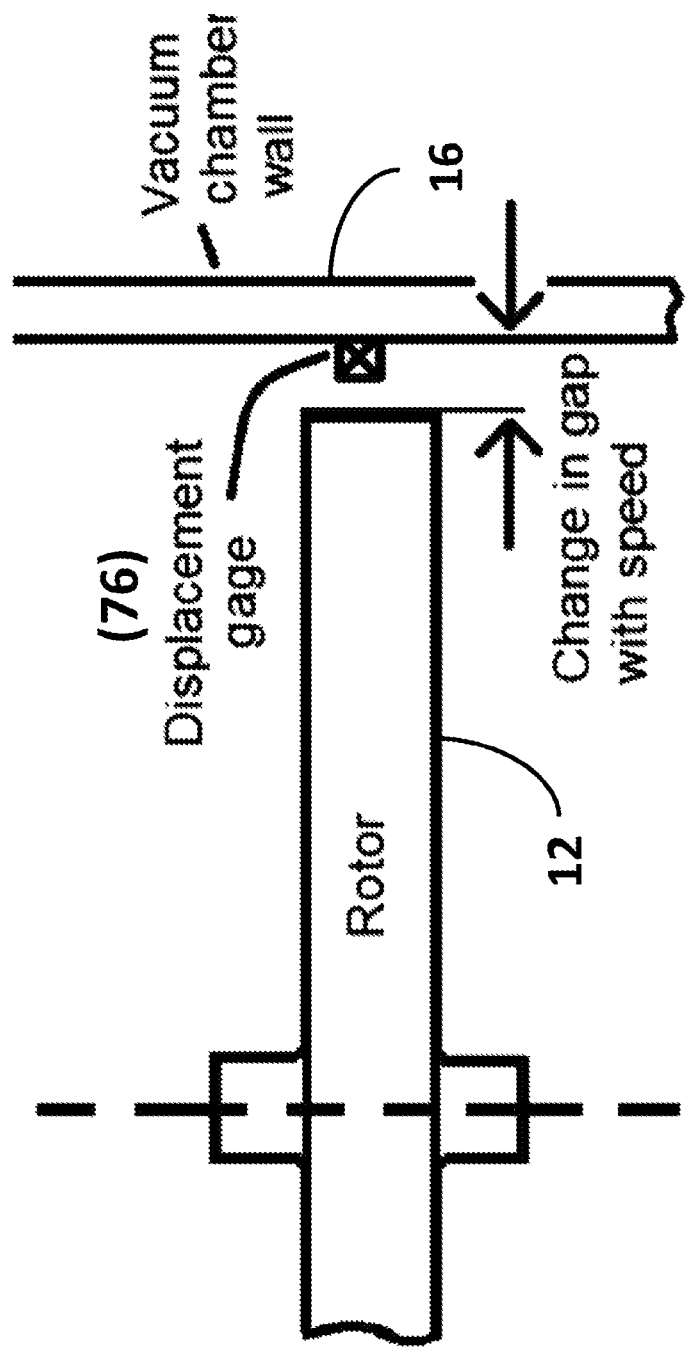
FIG. 12 is a schematic drawing showing the use of displacement gages for monitoring rotor diameter change while spinning.

Referring to FIG. 12, non-contacting displacement sensors 76, such as capacitive gages, located on the inside of the vacuum chamber wall 16 and spaced around the periphery of the rotor 12 determines the change in radius of the rotor with change in its speed. This information is useful to verify the numerical model as well as warn of anomalous displacement changes that may indicate impending rotor or bearing failure.

Figure 13:
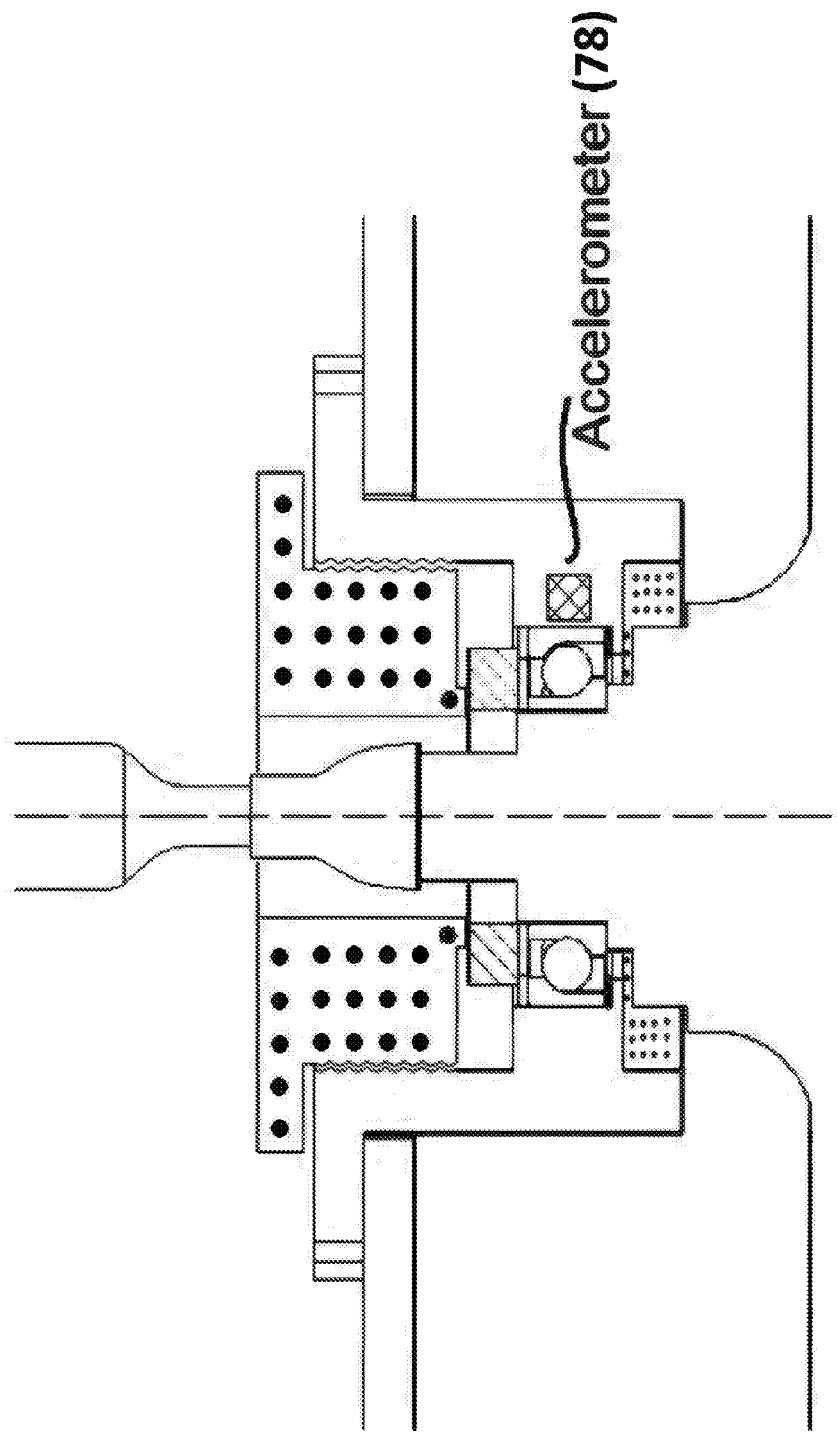
FIG. 13 is a schematic drawing showing the use of accelerometers to measure and monitor rotating imbalances in the rotor.

Referring to FIG. 13, two or more accelerometers 78 are mounted around the periphery of each bearing pack to measure the level of imbalance. The amplitudes of the accelerometer signals provide information on the mass of the imbalance when the rotor speed is known. When the time signature of each accelerometer signal is correlated with the motor rotary encoder, the angular location of the net imbalance in the rotor can be identified and removed in a subsequent machining operation. In addition, changes in the accelerometer signals during operation can be used as indicators of bearing wear and/or impending failure of the system.

Figure 14:
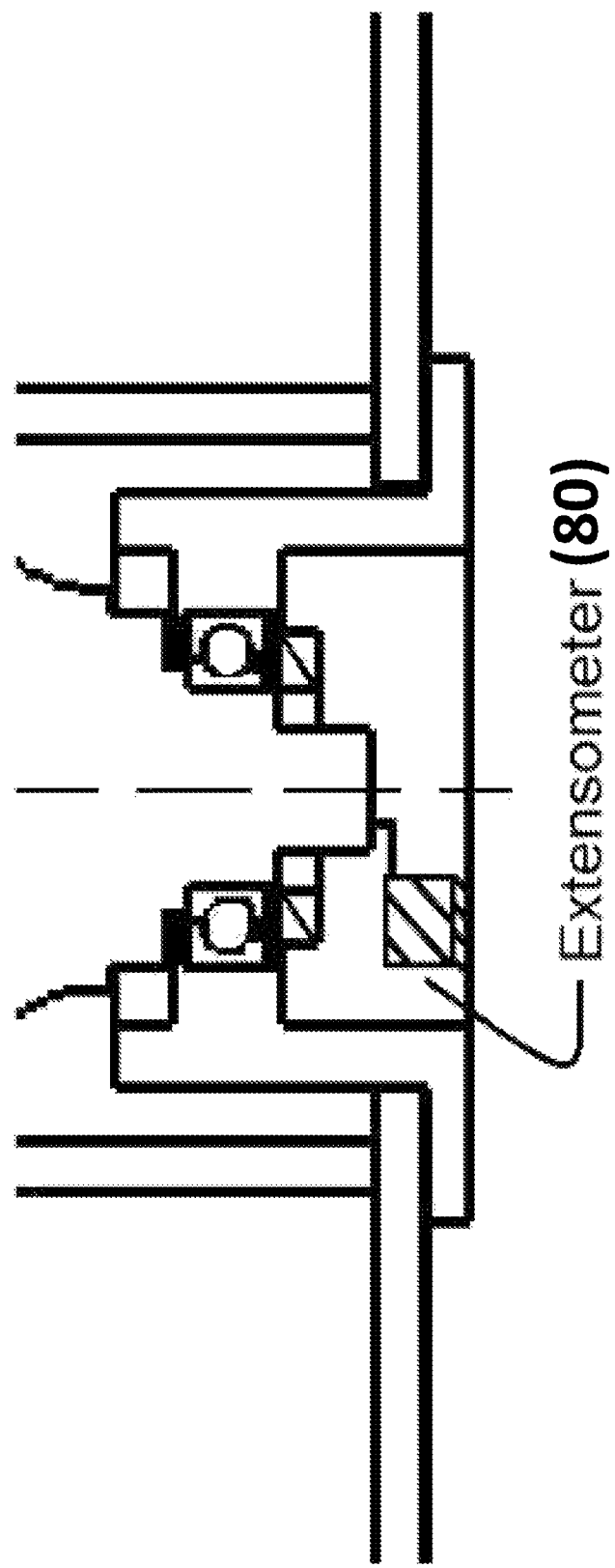
FIG. 14 is a schematic drawing showing the use of an extensometer to measure axial shaft displacement and vibration during operation.

Referring to FIG. 14, a displacement gage 80 is mounted at the base of the unit within the bearing pack to record the dynamic (axial) motion of the suspended rotor over its entire operating and pre-conditioning speed ranges to determine the speeds at which the rotor experiences each resonant mode. This information can also be used to indicate anomalous behavior of the system.

Figure 15:
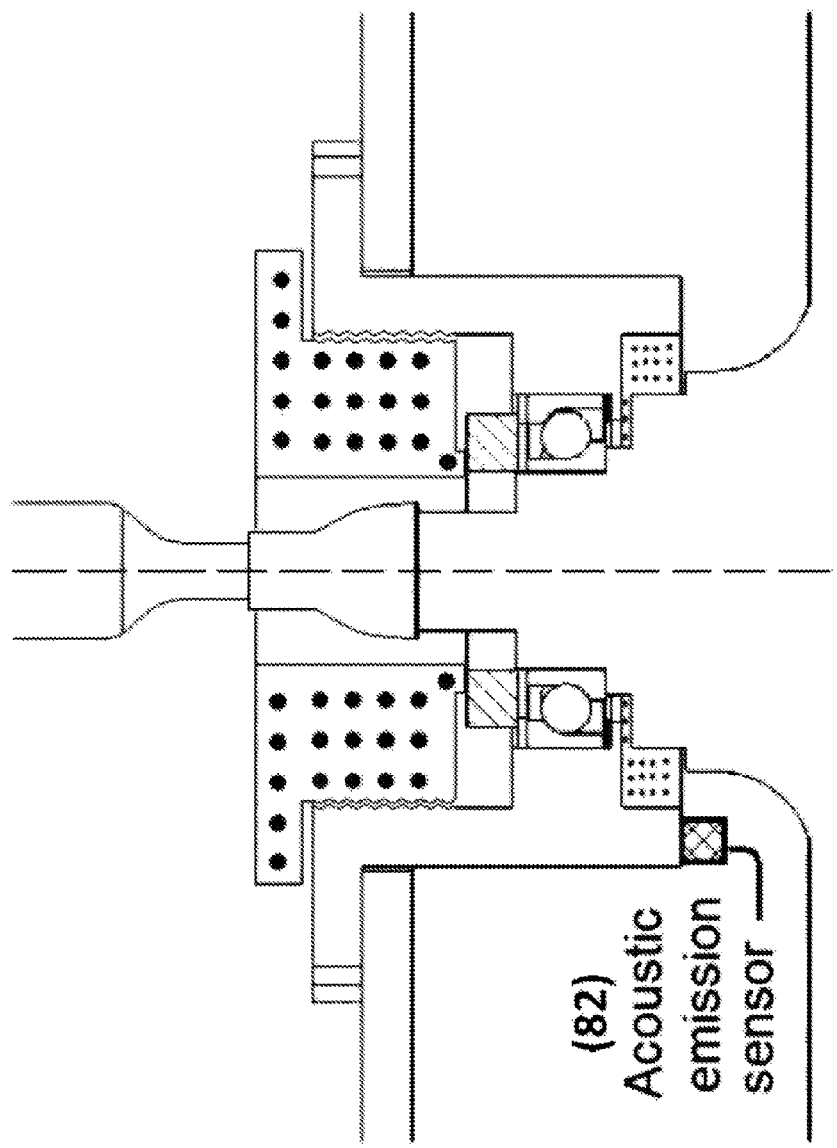
FIG. 15 is a schematic drawing showing the use of acoustic emission sensors for monitoring bearing wear and progressive damage in the device during operation.
Figure 16:
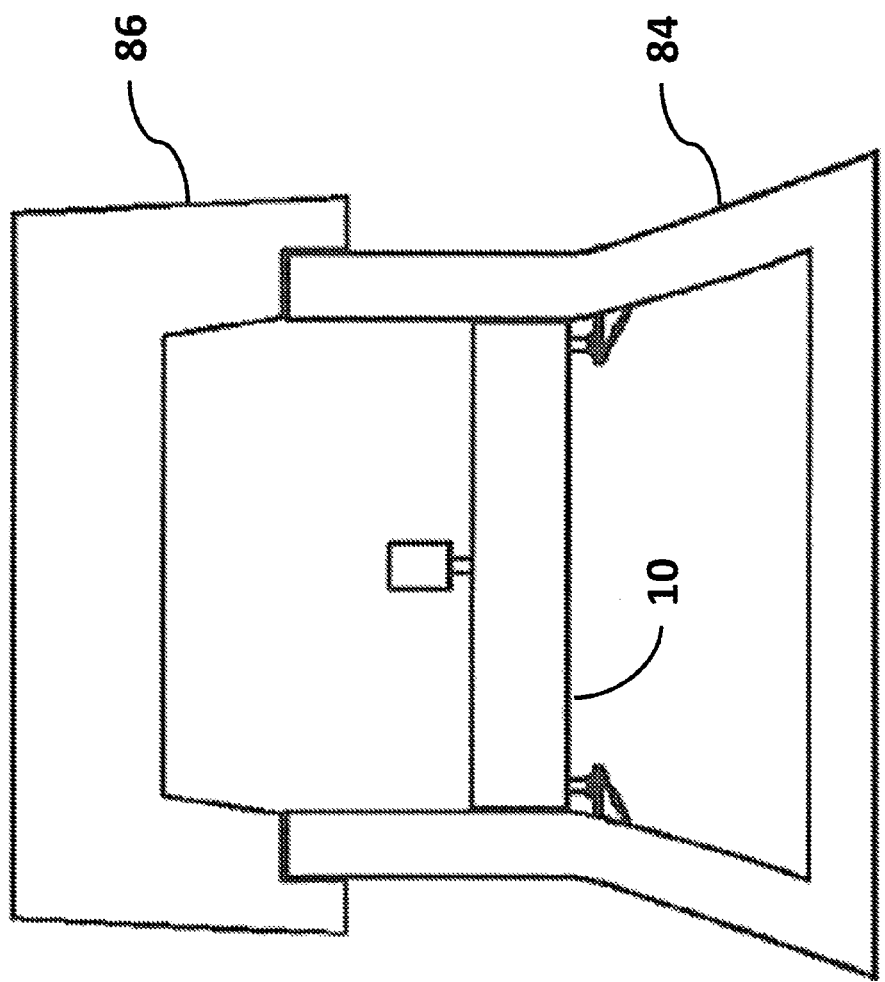
FIG. 16 is a schematic drawing showing a containment design for capturing fragments from a failed rotor.

Referring to FIG. 15, acoustic emission (AE) sensors 82 are placed on the structure at several locations, including at the bearing packs and inside the vacuum housing. These sensors measure high frequency (for example, 500 kHz) sounds emanating from bearings and or flaw propagation in the rotor thereby providing a measure of the wear or impending failure of one or more components in the system Referring to FIG. 16, a buried thick-walled steel and concrete containment structure 84, 86 is constructed to be in close proximity, preferably, in contact with the outside cylinder wall of the device 10. This arrangement keeps fragments resulting from rotor failure to be contained in rotational modes (minimizing translational modes) so that energy dissipation is facilitated by friction and particle-to-particle interaction. The containment structure has a tapered geometry 84 such that the diameter of the containment structure increases gradually with increasing depth from the bottom of the unit. At rotor failure, the fragments will tend to displace axially and be collected below the unit rather than move upward and be ejected above the surface.

Figure 17:
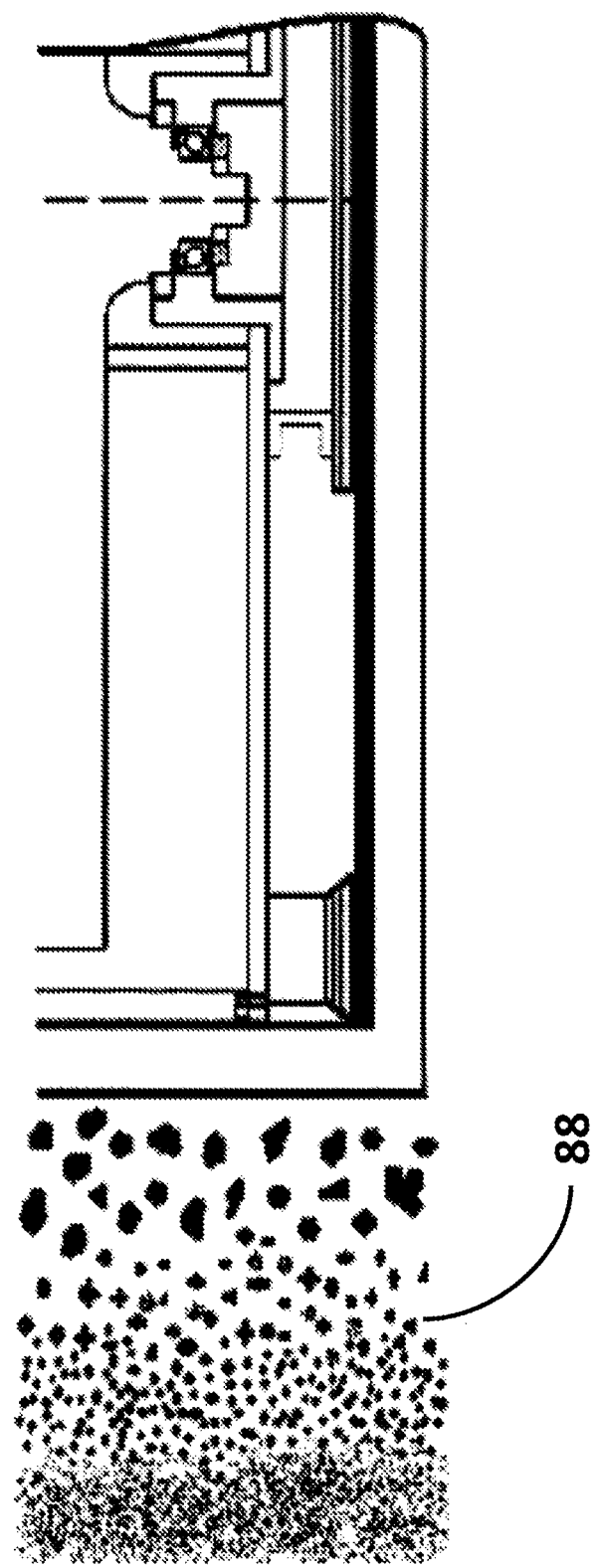
FIG. 17 is a schematic drawing showing a graded aggregate and sand arrangement for stopping fragments released during a rotor failure.

Referring to FIG. 17, an arrangement of graded aggregate 88 is placed such that aggregate size decreases with radial distance from the concrete wall. This results in an energy absorbing structure with larger porosity adjacent to the concrete containment structure and decreasing size of the particles with increasing radial distance.

Figure 18:
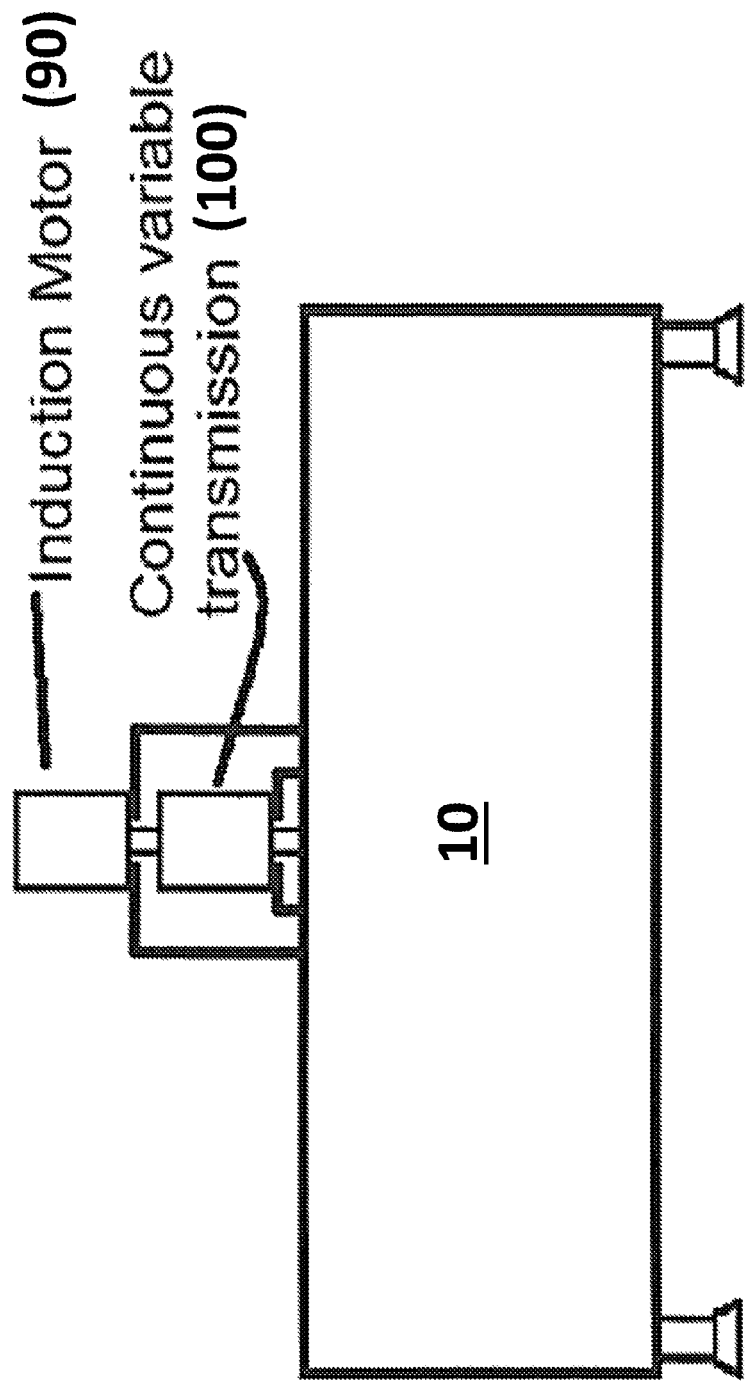
FIG. 18 is a schematic drawing showing an arrangement for using an induction motor as a motor/generator when coupled to the rotor through a continuously variable transmission (CVT).

Referring to FIG. 18, the device 10 is connected to an induction motor 90 through an electronic or mechanically controlled continuously variable transmission (CVT) 100 or other geared transmission. Over-driving the induction motor in this fashion past the slip speed makes it operate like a generator outputting power to the grid. Under-driving the motor by changing the gear ratio in the CVT will result in the induction motor being driven by the external power source to accelerate the rotor and thereby store energy. This is a low-cost method since it does not involve brushless DC motors, inverters, and their associated control and driver software schemes.

Figure 19:
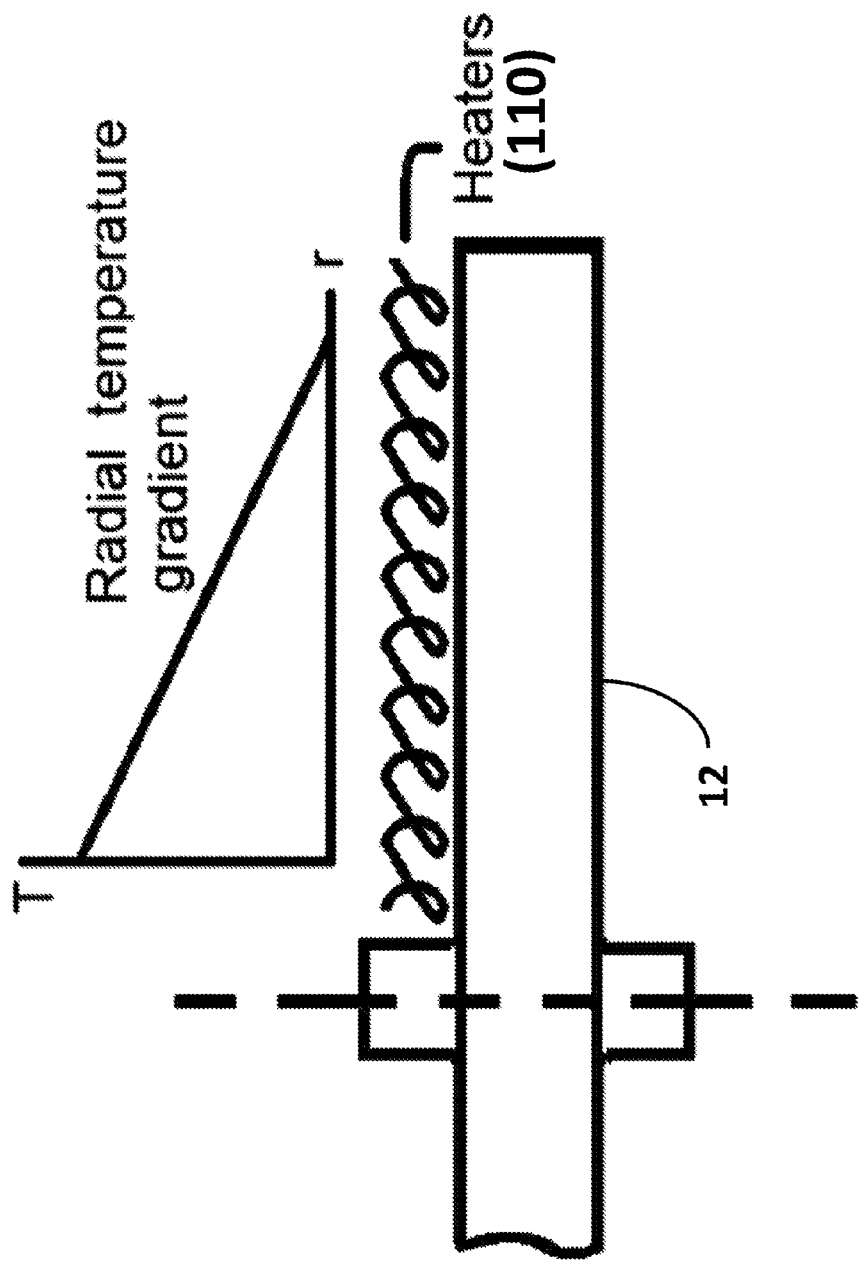
FIG. 19 is a schematic drawing showing the imposition of a thermal gradient in the rotor to improve the storage energy density through the introduction of beneficial thermal stresses.

Referring to FIG. 19, a radial temperature gradient is imposed on the rotor 12 by heaters 110. When the center of the rotor is at a higher temperature than its periphery, the resulting non-uniform thermal strain results in beneficial thermal stress (compressive at the center, tensile at the periphery), which improves the overall stress state and thereby increases the energy density in the rotor.

Figure 20:
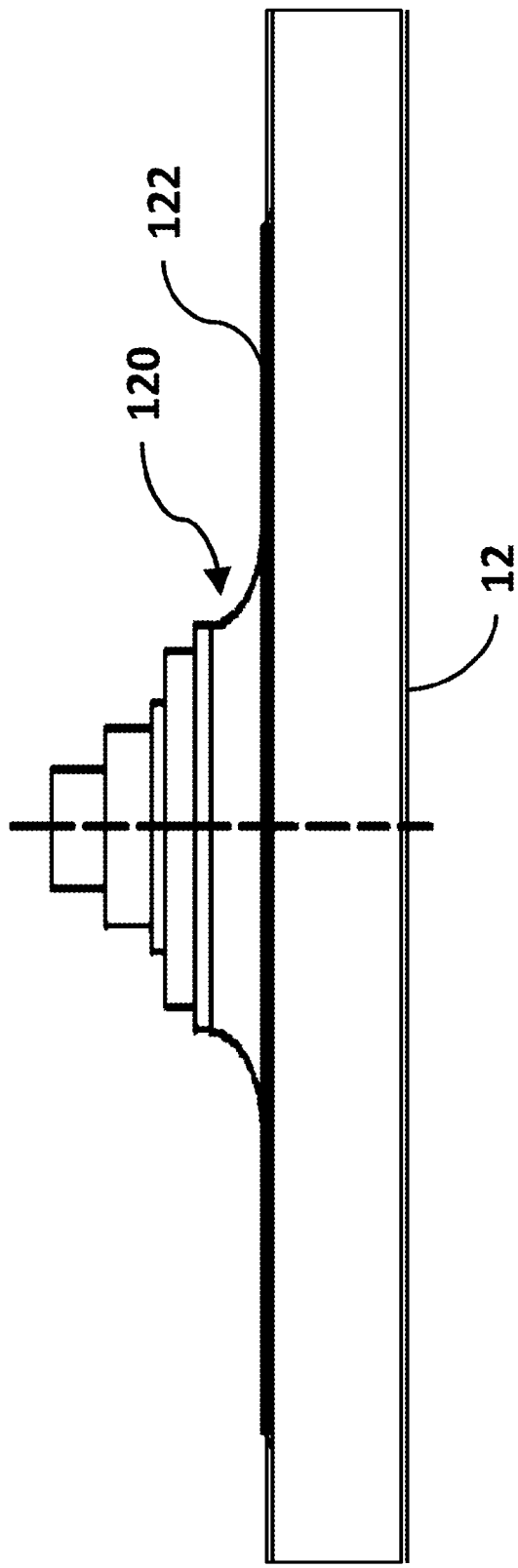
FIG. 20 is a schematic drawing showing a method for the attachment of a separately machined shaft to a rotor by adhesive bonding.

FIG. 20 illustrates a concept for using discrete, separately machined shafts 120, which may be made from an alloy steel that may be austenitic (and, therefore, non-magnetic) and adhesively bonded to the rotor 12 with a structural adhesive 122. Since the rotor is lifted directly by the magnetic off-loader, the stresses in the bond joints are low and primarily compressive, due to the axial compressive preload, and are easily accommodated by the bond strengths of conventional polymer structural adhesives. This approach allows one to use a rotor of very simple geometry that is easy to forge and machine since it does not have integral shafts.

Figure 21:
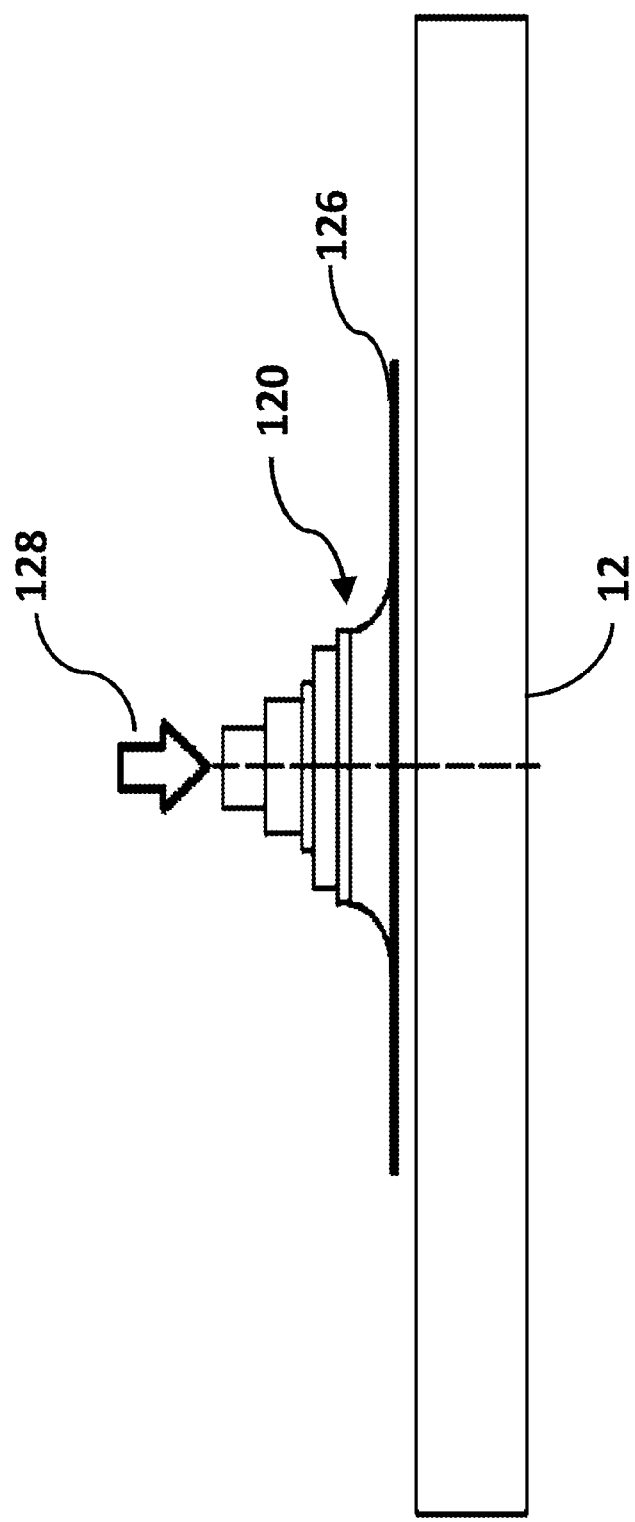
FIG. 21 is a schematic drawing showing a method for the attachment of a separately machined shaft to a rotor by fusion or friction welding.

Referring to FIG. 21, the rotor 12 is a simple fixed or variable thickness disk without shafts as in FIG. 20. In this case, the shafts 120 are welded to the rotor. In some embodiments, the shafts may be welded to the motor with conventional fusion fillet welds between contact surface 126 and rotor 12. Following the welding operation, conventional heat treatment procedures remove stress concentrations introduced into the rotor at the weld locations. Since the rotor is lifted directly by the magnetic off-loader, the stresses in the welds are low.

In another embodiment, the shafts 120 are friction-welded to the rotor using a high axial force 128 to press the shaft onto a rotating rotor blank. The contact surface 126 reaches a high temperature sufficient to weld the interface. Following the welding operation, conventional heat treatment procedures remove stress concentrations introduced into the rotor at the weld. Since the rotor is lifted directly by the magnetic off-loader, the stresses in the welds are low.

Figure 22:
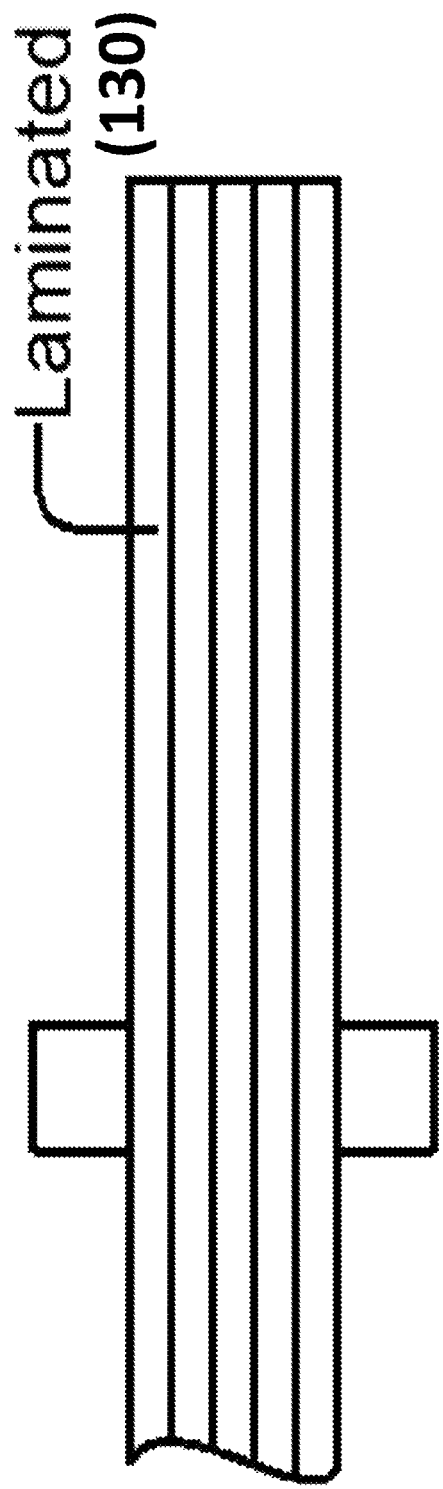
FIG. 22 is a schematic drawing showing a rotor made from several laminations.

Referring to FIG. 22, the rotor is constructed from several laminated plates that are adhesively bonded together using conventional structural adhesives. The only stress in the joints between the laminations is gravity loading which occurs when the rotor is lifted. This stress is low and easily accommodated by the adhesive tensile strength. For example, for ten laminations each 25 mm in thickness (1 inch), the tensile stress in the first lamination joint (the most highly loaded bonded joint) is less than 0.021 MPa (3 psi). Structural adhesives have tensile strengths readily exceeding 7 MPa (1000 psi). Thin laminas can be individually heat-treated to higher strengths thereby increasing the rotor energy density. In addition, laminated rotors have a high degree of redundancy since flaw propagation in one lamina tends to be restricted by the adjacent laminas. In addition, failure of one lamina does not result in failure of the entire rotor. Also, since the laminas are thin, they are in a state of biaxial plane stress when the rotor is spinning which is a more uniform stress state than the biaxial plane strain state that exists in a thick monolithic rotor. In addition, thin plates can be heat-treated to a higher yield strength than thick plates; thus, a rotor comprising of thin plates laminated together will exhibit a higher energy density than in a monolithic rotor of the same total thickness.

Figure 23:
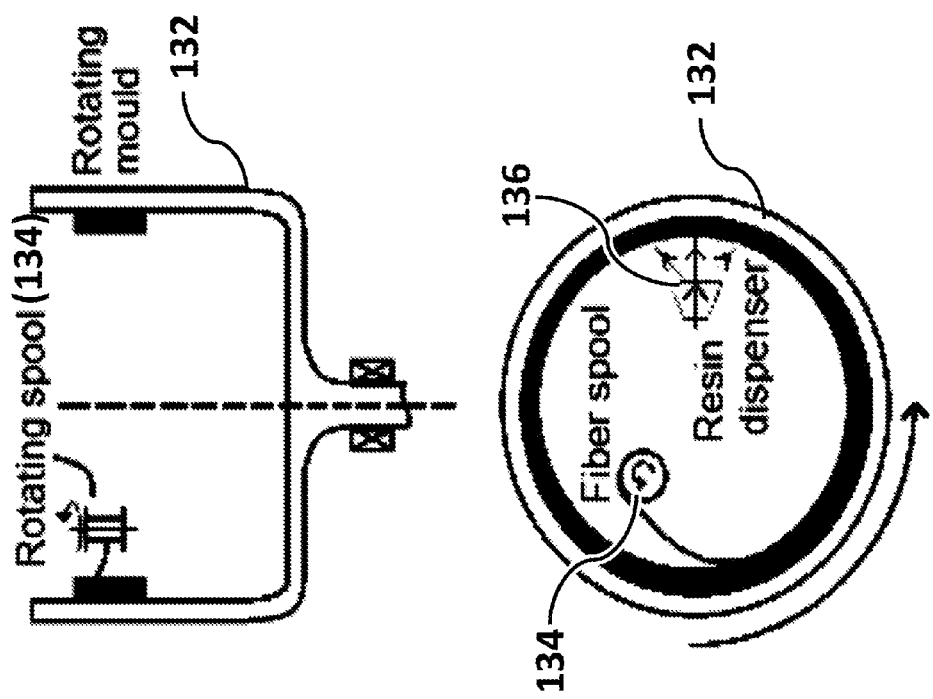
FIG. 23 is a schematic drawing showing a method for the rapid manufacture of a composite ring using dry fiber bundles dispensed into a rotating mold together with pre-catalyzed resin.

Referring to FIG. 23, a composite fiber-reinforced ring is manufactured using a high-speed rotating cylindrical mold 132 into which is fed a fiber bundle from a rotating spool 134 located inside the mold whose spin axis is parallel to the rotating mold axis. As the fiber bundle is unwound from the spool, it is held against the inside surface of the rotating mold by centrifugal force. Room temperature curing pre-catalyzed thermosetting resin is sprayed from a nozzle 136 perpendicular to the vertical wall of the rotating mold onto the fiber bundle lying against the wall. The high g-force provides adequate pressure for the liquid resin to infiltrate the fiber bundle as curing of the resin proceeds. When the cure is complete, the mold is removed and the ring ejected from the mold. This process is 10 to 50 times faster than filament winding, the conventional process for manufacturing composite rings. For example, fiber dispensing rates of 4500 m/min are possible compared to filament winding rates of 60-90 m/min. Alternatively, a resin system that cures at elevated temperature may be used together with a method for heating the mold surface either by internal electrical resistance heaters, gas fired heaters, or infrared lamps illuminating the mold from the inside. Alternatively, the rotating mold has a central shaft and shaft lip seals so that infiltration and curing may be done in vacuum to minimize voids in the composite. Additional spools may be simultaneously deployed such that processing times can be further reduced and/or different fibers (glass, carbon, Kevlar, metal wires, etc.) can be dispensed simultaneously or in sequence such that the final composite ring has a layered structure of different fiber types that may be advantageous in certain applications. Alternatively, different resin systems can be applied in sequence to vary properties radially. For example, a composite ring can be readily fabricated in this manner with carbon fibers at its outside diameter and glass fibers at its inside diameter. Due to the high g-loading in this application, void-free composite rings can be produced at high rates.

Figure 24:
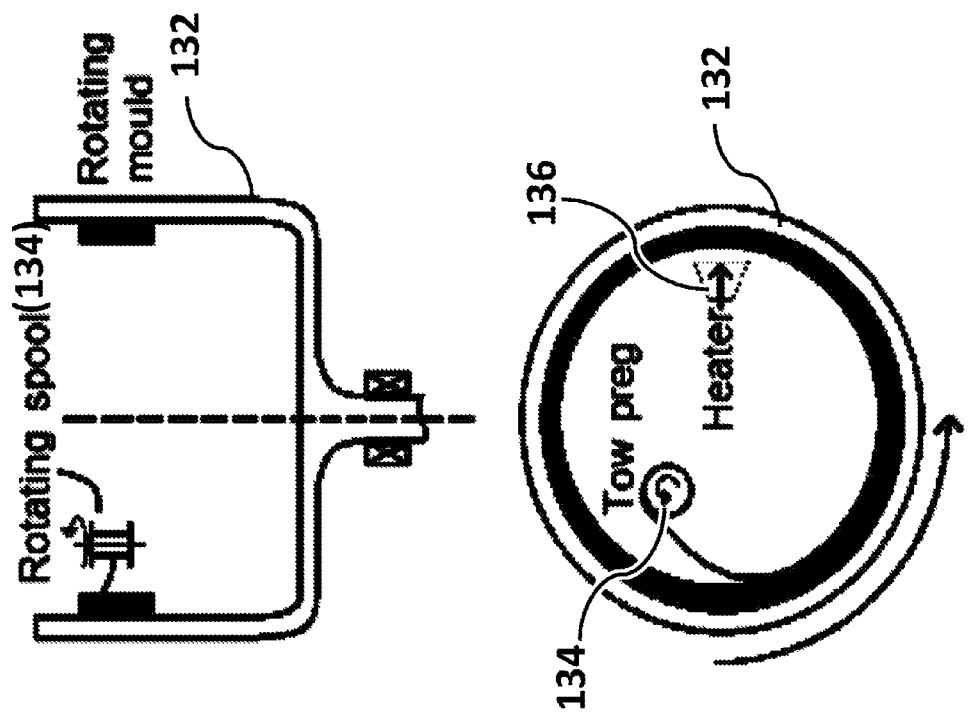
FIG. 24 is a schematic drawing showing a method for the rapid manufacture of a composite ring using pre-impregnated fiber bundles (tow preg) dispensed into an internally heated rotating mold.

Referring to FIG. 24, a pre-impregnated and partially cured fiber bundle (tow preg, 138) is dispensed from a spool 134 as in FIG. 23 into a high-speed rotating cylindrical mold 132. An internal 142 (or external) heater heats the dispensed tow preg enabling it to flow and cure.

What is claimed is:

1. A flywheel device comprising:
   a sealed housing section;
   a rotor disposed within the housing section;
   a first bearing housing comprising lower contact bearings and a second bearing housing comprising upper contact bearings disposed between the rotor and a plate; and
   an off-loading electromagnet configured to provide a vertical off-loading force that lifts the rotor against the upper contact bearings in a vertical direction and off of the lower contact bearings.

2. The flywheel device of claim 1, further comprising:
   a load sensor configured to measure a load applied to at least one of the upper contact bearings or the lower contact bearings; and
   a control system configured to adjust a field of the off-loading electromagnet based on the measured load.

3. The flywheel device of claim 2, wherein the controller is configured to compare the measured load to predetermined load limits.

4. The flywheel device of claim 2, wherein the load applied to at least one of the upper contact bearings or the lower contact bearings comprises a vertical force that is applied against the at least one of the upper contact bearings or the lower contact bearings.

5. The flywheel device of claim 1, further comprising a plurality of stiffening ribs welded to a top plate of the housing section.

6. The flywheel device of claim 1, further comprising a spring configured to exert a minimum required force in the vertical direction on at least one of the lower contact bearings or the upper contact bearings via the rotor.

7. The flywheel device of claim 1, wherein the housing section is hermetically sealed and provides a vacuum envelope within which the rotor is disposed.

8. The flywheel device of claim 7, wherein a shaft of the rotor extends through the vacuum envelope via a low-friction lip seal.

9. The flywheel device of claim 8, wherein the low-friction lip seal comprises a fluoropolymer lip seal.

10. The flywheel device of claim 8, wherein a motor and at least one of the first bearing housing or the second bearing housing are located outside the vacuum envelope.

11. The flywheel device of claim 7, wherein the housing section is configured to support the rotor, provide an alignment fixture for the first bearing housing, the second bearing housing, and a shaft of the rotor, and provide a suspension system for the rotor.

12. The flywheel device of claim 1, wherein the housing section comprises a top plate that provides a suspension element for the rotor.

13. The flywheel device of claim 1, wherein the off-loading electromagnet is structurally integrated into a top plate of a vacuum chamber formed by the housing section.

14. The flywheel device of claim 1, wherein the off-loading electromagnet comprises a single coil of insulated copper wire.

15. The flywheel device of claim 1, wherein the housing section comprises a top plate, a bottom plate, and a cylindrical section.

16. The flywheel device of claim 1, further comprising an actuator configured to remotely adjust an axial position of the rotor within the housing section.

17. The flywheel device of claim 16, wherein the actuator comprises a motor-driven worm gear.

18. The flywheel device of claim 1, wherein the rotor comprises a disc-shaped rotor coupled to a separate non-magnetic shaft.

19. The flywheel device of claim 1, wherein the rotor comprises a plurality of laminated plates that are adhesively bonded together.

20. The flywheel device of claim 1, wherein the off-loading force that lifts the rotor against the upper contact bearings in the vertical direction causes the rotor to apply a vertical force to the upper contact bearings.

* * * * *